United States Patent
Liu et al.

(10) Patent No.: US 10,620,825 B2
(45) Date of Patent: Apr. 14, 2020

(54) METHOD AND APPARATUS FOR CONTROLLING DISPLAY AND MOBILE TERMINAL

(71) Applicant: Xiaomi Inc., Beijing (CN)

(72) Inventors: Anyu Liu, Beijing (CN); Hui Du, Beijing (CN); Guosheng Li, Beijing (CN)

(73) Assignee: XIAOMI INC., Beijing (CN)

( * ) Notice: Subject to any disclaimer, the term of this patent is extended or adjusted under 35 U.S.C. 154(b) by 732 days.

(21) Appl. No.: 15/182,887

(22) Filed: Jun. 15, 2016

(65) Prior Publication Data

US 2016/0378334 A1    Dec. 29, 2016

(30) Foreign Application Priority Data

Jun. 25, 2015 (CN) .......................... 2015 1 0357492

(51) Int. Cl.
*G06F 3/0488* (2013.01)
*G06F 3/041* (2006.01)
(Continued)

(52) U.S. Cl.
CPC ........ *G06F 3/04886* (2013.01); *G06F 1/1643* (2013.01); *G06F 1/1686* (2013.01);
(Continued)

(58) Field of Classification Search
CPC .............. G06F 3/04886; G06F 3/0416; G06F 2203/04803
See application file for complete search history.

(56) References Cited

U.S. PATENT DOCUMENTS 5,564,004 A * 10/1996 Grossman ............. G06F 3/0481 715/811
5,835,079 A * 11/1998 Shieh .................... G06F 3/0488 345/173

(Continued)

FOREIGN PATENT DOCUMENTS

CN    102346644 A    2/2012
CN    103067807 A    4/2013

(Continued)

OTHER PUBLICATIONS

English Translation of International Search Report dated Feb. 25, 2016 for International Application No. PCT/CN2015/090296, 6 pages.

(Continued)

*Primary Examiner* — Ryan Barrett
(74) *Attorney, Agent, or Firm* — Brinks Gilson & Lione

(57) ABSTRACT

A mobile terminal for controlling display includes: a frame body including a middle frame; a touch screen provided on a front surface of the frame body and attached onto the middle frame; wherein the touch screen covers whole of the front surface of the frame body, or the touch screen covers a remaining area except a predetermined area on the front surface of the frame body, the predetermined area being an exposure area for additional electronic devices provided on the front surface of the frame body; a touch integrated circuit connected with the touch screen; and a processor connected with the touch integrated circuit. According to the disclosure, the whole front surface of the frame body is covered by the touch screen without providing the upper forehead area and the lower button area thereon.

20 Claims, 16 Drawing Sheets

(51) Int. Cl.
  *G06F 1/16* (2006.01)
  *H04M 1/725* (2006.01)
  *G06F 3/0481* (2013.01)
  *G06F 3/0484* (2013.01)
  *G06F 3/0486* (2013.01)

(52) U.S. Cl.
  CPC .......... *G06F 1/1688* (2013.01); *G06F 3/0416* (2013.01); *G06F 3/0481* (2013.01); *G06F 3/04845* (2013.01); *H04M 1/72519* (2013.01); *G06F 3/0486* (2013.01); *G06F 3/04883* (2013.01); *G06F 2203/04803* (2013.01); *H04M 2250/22* (2013.01); *H04M 2250/52* (2013.01)

(56) References Cited

U.S. PATENT DOCUMENTS

| | | | | |
|---|---|---|---|---|
| 6,760,048 B1* | 7/2004 | Bates | G06F 3/0481 | 715/781 |
| 7,434,177 B1* | 10/2008 | Ording | G06F 3/04842 | 715/862 |
| 8,519,971 B1* | 8/2013 | Mackraz | G06F 3/147 | 313/504 |
| 9,367,524 B1* | 6/2016 | Filev | G06F 17/2247 | |
| 2002/0122072 A1* | 9/2002 | Selker | G06F 3/0482 | 715/834 |
| 2002/0171690 A1* | 11/2002 | Fox | G06F 3/04812 | 715/862 |
| 2002/0191029 A1* | 12/2002 | Gillespie | G06F 3/0481 | 715/810 |
| 2004/0141010 A1* | 7/2004 | Fitzmaurice | G06F 3/0488 | 715/810 |
| 2005/0012723 A1* | 1/2005 | Pallakoff | G06F 1/1616 | 345/173 |
| 2005/0138564 A1* | 6/2005 | Fogg | G06F 3/0481 | 715/745 |
| 2006/0026521 A1* | 2/2006 | Hotelling | G06F 3/0418 | 715/702 |
| 2006/0086022 A1* | 4/2006 | Would | G06F 3/0482 | 40/584 |
| 2006/0132460 A1* | 6/2006 | Kolmykov-Zotov | G06F 3/04812 | 345/173 |
| 2006/0132474 A1* | 6/2006 | Lam | G09G 3/20 | 345/204 |
| 2007/0152976 A1* | 7/2007 | Townsend | G06F 3/0416 | 345/173 |
| 2007/0168873 A1* | 7/2007 | Lentz | G06F 3/04812 | 715/763 |
| 2007/0209025 A1* | 9/2007 | Jing | G06F 16/54 | |
| 2007/0266319 A1* | 11/2007 | Matsuo | G06F 9/45512 | 715/700 |
| 2008/0059893 A1* | 3/2008 | Byrne | G06F 3/0481 | 715/757 |
| 2008/0136785 A1* | 6/2008 | Baudisch | G06F 3/0488 | 345/173 |
| 2009/0100384 A1* | 4/2009 | Louch | G06F 1/1626 | 715/863 |
| 2009/0179914 A1* | 7/2009 | Dahlke | G06F 1/1626 | 345/619 |
| 2009/0210820 A1* | 8/2009 | Adachi | G06F 3/0481 | 715/786 |
| 2009/0228841 A1* | 9/2009 | Hildreth | G06F 3/0304 | 715/863 |
| 2010/0057696 A1* | 3/2010 | Miyazawa | H04N 5/44543 | 707/E17.014 |
| 2010/0100853 A1* | 4/2010 | Ciudad | G06F 3/012 | 715/856 |
| 2010/0156795 A1* | 6/2010 | Kim | G06F 3/0416 | 345/168 |
| 2010/0182247 A1* | 7/2010 | Petschnigg | G06F 1/1647 | 345/173 |
| 2010/0188426 A1* | 7/2010 | Ohmori | G06F 3/012 | 345/660 |
| 2010/0189426 A1* | 7/2010 | Bao | G06F 3/012 | 396/77 |
| 2010/0235770 A1* | 9/2010 | Ording | G06F 1/1626 | 715/765 |
| 2010/0328333 A1* | 12/2010 | Shi | G09G 3/342 | 345/589 |
| 2011/0043455 A1* | 2/2011 | Roth | G06F 3/0488 | 345/173 |
| 2011/0148917 A1* | 6/2011 | Alberth, Jr. | G09G 5/14 | 345/629 |
| 2011/0175932 A1* | 7/2011 | Yu | G06F 3/013 | 345/661 |
| 2012/0032979 A1* | 2/2012 | Blow | G06F 1/1626 | 345/647 |
| 2012/0038675 A1* | 2/2012 | Johnson | G06F 1/1686 | 345/660 |
| 2012/0092318 A1* | 4/2012 | Mishra | G06F 3/1438 | 345/211 |
| 2012/0190386 A1* | 7/2012 | Anderson | G01C 15/04 | 455/456.3 |
| 2012/0268409 A1* | 10/2012 | Soo | G06F 3/0416 | 345/173 |
| 2012/0287076 A1* | 11/2012 | Dao | G06F 1/1626 | 345/174 |
| 2012/0308204 A1* | 12/2012 | Hwang | G06F 3/04847 | 386/241 |
| 2012/0314899 A1* | 12/2012 | Cohen | G06F 3/012 | 382/103 |
| 2012/0324381 A1* | 12/2012 | Cohen | G06F 3/04886 | 715/765 |
| 2013/0002723 A1* | 1/2013 | Poston | G06F 3/0482 | 345/666 |
| 2013/0031470 A1* | 1/2013 | Daly, Jr. | G06F 17/211 | 715/243 |
| 2013/0033485 A1* | 2/2013 | Kollin | G06F 1/1637 | 345/419 |
| 2013/0097550 A1* | 4/2013 | Grossman | G06F 3/0488 | 715/779 |
| 2013/0100061 A1* | 4/2013 | Kawauchi | G06F 3/0488 | 345/173 |
| 2013/0120447 A1 | 5/2013 | Kim et al. | | |
| 2013/0159931 A1* | 6/2013 | Lee | G06F 1/1671 | 715/835 |
| 2013/0207913 A1* | 8/2013 | Takashima | G06F 3/044 | 345/173 |
| 2013/0212487 A1* | 8/2013 | Cote | G06F 9/451 | 715/745 |
| 2013/0234948 A1* | 9/2013 | Jian | G06F 3/0487 | 345/169 |
| 2013/0246970 A1 | 9/2013 | Helle | | |
| 2013/0283208 A1* | 10/2013 | Bychkov | G06F 3/017 | 715/810 |
| 2013/0293588 A1* | 11/2013 | Yu | G06F 1/1626 | 345/660 |
| 2013/0332475 A1* | 12/2013 | Michelstein | G06F 17/211 | 707/756 |
| 2014/0055371 A1* | 2/2014 | Li | G06F 3/04883 | 345/173 |
| 2014/0092043 A1* | 4/2014 | de Leon | G06F 3/0488 | 345/173 |
| 2014/0092045 A1* | 4/2014 | Ananthapadmanabh | G06F 3/0488 | 345/173 |
| 2014/0092140 A1* | 4/2014 | Wadhwa | G09G 3/20 | 345/660 |
| 2014/0176456 A1 | 6/2014 | Yoon | | |
| 2014/0198057 A1* | 7/2014 | Xia | G06F 3/04883 | 345/173 |
| 2014/0245230 A1* | 8/2014 | Durham | G06F 3/0425 | 715/848 |
| 2014/0292697 A1* | 10/2014 | Morishita | G06F 3/0487 | 345/173 |
| 2014/0344608 A1* | 11/2014 | Wang | G06F 1/3287 | 713/324 |

(56) References Cited

U.S. PATENT DOCUMENTS

| | | | |
|---|---|---|---|
| 2015/0015500 A1 | 1/2015 | Lee et al. | |
| 2015/0015506 A1* | 1/2015 | Lares | G06F 3/0488 345/173 |
| 2015/0149956 A1* | 5/2015 | Kempinski | G06F 3/017 715/784 |
| 2015/0370340 A1* | 12/2015 | Papalia | G06F 1/1664 345/168 |
| 2016/0077616 A1* | 3/2016 | Durojaiye | G06F 3/03545 345/173 |
| 2016/0103610 A1* | 4/2016 | Huh | G06F 3/14 345/168 |
| 2016/0147365 A1* | 5/2016 | Yoshida | G06F 3/044 345/174 |
| 2016/0291764 A1* | 10/2016 | Herring | G06F 3/0416 |
| 2017/0344108 A1* | 11/2017 | Mosqueda Mejia | G06F 3/013 |
| 2018/0173393 A1* | 6/2018 | Verdier | G06F 3/0488 |

FOREIGN PATENT DOCUMENTS

| | | |
|---|---|---|
| CN | 203311823 U | 11/2013 |
| CN | 203366302 U | 12/2013 |
| CN | 103777817 A | 5/2014 |
| CN | 103885592 A | 6/2014 |
| CN | 104281405 A | 1/2015 |
| CN | 104464521 A | 3/2015 |
| CN | 104539804 A | 4/2015 |
| CN | 104679362 A | 6/2015 |
| EP | 2 804 386 A1 | 11/2014 |
| EP | 2 874 053 A2 | 5/2015 |
| JP | 0003194001 U | 10/2014 |
| JP | 2014-216995 A | 11/2014 |
| JP | 2014-241043 A | 12/2014 |
| KR | 10-1263861 B1 | 5/2013 |
| KR | 10-2014-0051590 A | 5/2014 |
| KR | 10-2015-0065415 A | 6/2015 |
| RU | 2 523 937 C2 | 7/2014 |
| WO | WO 2012/137443 A1 | 10/2012 |

OTHER PUBLICATIONS

Kelvin, iPhone 7 Already Reinvents the Apple Handset Format, With Edge to Edge Display, printed from the internet at <http://web.archive.org/web/20141215161733/http://www.concept-phones.com/apple/iphone-7-reinvents-apple-handset-format-edge-edge-display>, Nov. 16, 2014, 7 pages.

Office Action dated Jul. 18, 2017 for Japanese Application No. 2017-524087, 6 pages.

Office Action dated Aug. 16, 2016 for Korean Application No. 10-2015-7033079, 9 pages.

Office Action dated Apr. 25, 2017 for Russian Application No. 2016101406/08, 11 pages.

Office Action dated Mar. 5, 2019 for Chinese Application No. 201510357492.4, 8 pages.

Office Action dated Oct. 25, 2019 for Chinese Application No. 201510357492.4, 7 pages.

\* cited by examiner

METHOD AND APPARATUS FOR CONTROLLING DISPLAY AND MOBILE TERMINAL

PRIORITY STATEMENT

This application is based on and claims priority to Chinese Patent Application No. 201510357492.4, filed on Jun. 25, 2015, the entire contents of which are incorporated herein by reference.

TECHNICAL FIELD

The present disclosure generally relates to technical field of display, and more particularly, to a method and an apparatus for controlling display, and a mobile terminal.

BACKGROUND

Smart mobile phone has become one of the most widely used electronic device in daily life.

A frame body of a smart mobile phone may include an upper forehead area, a middle screen area, and a lower button area on a front side thereof. Generally, the upper forehead area is provided therein with elements such as a receiver sound hole, a front camera and the like; the middle screen area is provided with a touch screen therein; and the lower button area is provided with one to three physical buttons. Among those areas, the middle screen area is used to display content Because of the above structure the front surface of the frame body generally is covered by the touch screen with the upper forehead area and the lower button area thereon. As a result, the smart mobile phone normally has a limited screen-to-bezel ratio, and thus a limited screen area to display information.

SUMMARY

Embodiments of the present disclosure provide a method and an apparatus for controlling display as well as a mobile terminal. Technical solutions are described as followings.

According to an aspect of the present disclosure, a mobile terminal may include a touch screen; a processor-readable storage medium, including a set of instructions for controlling display of the mobile terminal on the touch screen; and a processor in communication with the storage medium and the touch screen. When executing the set of instructions, the processor is directed to: divide the touch screen into a plurality of display regions, each of the plurality of display regions is configured to display contents of an individually predetermined content type; control a display status for each of the plurality of display regions separately; and display content in a target display region of the plurality of display regions when the target display region is in an activated state.

According to another aspect of the present disclosure, a method for controlling display of the mobile terminal on its touch screen may include: dividing, by a hardware processor of a mobile terminal having a touch screen, the touch screen into a plurality of display regions, each of the plurality of display regions is configured to display contents of an individually predetermined content type; controlling, by the processor, a display status for each of the plurality of display regions separately; and displaying, by the processor, content in a target display region of the plurality of display regions when the target display region is in an activated state.

Through the embodiments and/or technical solution in the present disclosure, the following advantageous effects may be achieved.

The whole front surface of the frame body is covered by the touch screen without providing the upper forehead area and the lower button area thereon, so that a higher screen-to-bezel ratio may be obtained for the mobile terminal, and thus a larger area may be enabled to display information.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

Specific embodiments of the present disclosure are shown by the above drawings, and more detailed description will be made hereinafter. These drawings and text description are not for limiting the scope of conceiving the present disclosure in any way, but for illustrating the concept of the present disclosure for those skilled in the art by referring to specific embodiments.

DETAILED DESCRIPTION

Reference will now be made in detail to exemplary embodiments, examples of which are illustrated in the accompanying drawings. When the following description involves content of the accompanying drawings, the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1A:
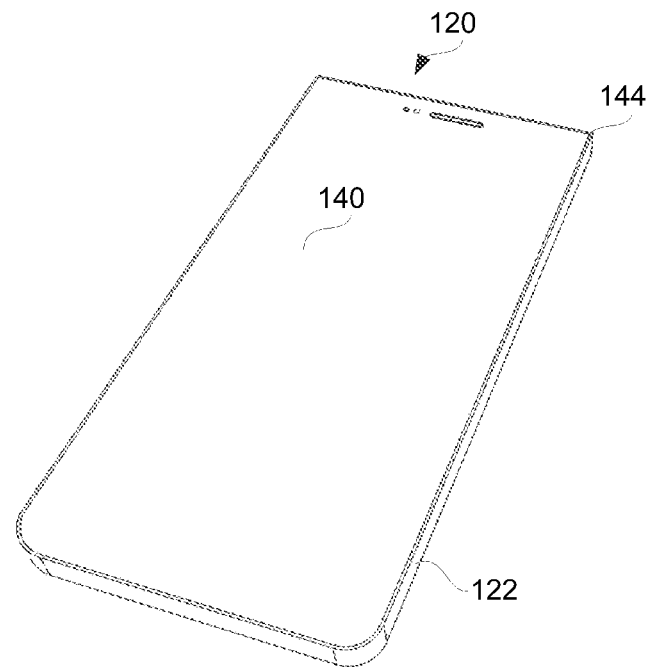
FIG. 1A is a block diagram illustrating a mobile terminal according to an exemplary embodiment.

FIG. 1A is a block diagram illustrating a mobile terminal according to an exemplary embodiment. The mobile terminal may be a smart mobile phone or another electronic device capable of conducting mobile communication. The mobile terminal may include a frame body 120, a touch screen 140, and electronic components (e.g., electronic circuits, not shown) enclosed in the frame body.

The frame body 120 may be in shape of a hexahedron, and some edges or corners of the hexahedron may be arc-chamfered. The frame body 120 may include a middle frame 122. A front surface of the frame body 120 may be in shape of a rounded rectangle or a right-angled rectangle.

The touch screen 140 may be on the front surface of the frame body 120 and attached onto the middle frame 122, and the touch screen 140 may cover the whole front surface of the frame body 120. In other words, there is no upper forehead area or lower button area on the front surface of the frame body 120, while both the forehead area and the lower button area are covered by the touch screen 140.

Alternatively, the touch screen 140 may include a slim bezel 144. The slim bezel 144 may be used to accommodate bezel adhesive and/or marginal touch circuit. The marginal touch circuit may be provided in a structure of Cs(storage capacitor)-on-gate type of Cs-on-common type.

Alternatively, both corners adjoined by one edge of the touch screen (e.g., two adjacent corners on one side of the touch screen) may be right-angled, while the other two corners may be right-angled or round-angled. In an exemplary embodiment, two corners adjoined by an edge where the marginal touch circuit is provided are right-angled, so as to facilitate accommodating the marginal touch circuit at the edge. The edge where the marginal touch circuit is provided may be any one of upper edge, lower edge, left edge and right edge. However, an example in which the edge is upper edge is illustrated by the drawing.

Alternatively, an OLED (Organic Light-Emitting Diode) display may be adopted as the touch screen 140.

The mobile terminal may further include the electronic exponents, such as a touch integrated circuit (not shown in the drawing) connected with the touch screen 140 and a processor (not shown in the drawing) connected with the touch integrated circuit.

As described above, in the mobile terminal according to the present embodiment, the whole of front surface of the frame body may be covered by the touch screen without providing the upper forehead area and the lower button area thereon, so that a higher screen-to-bezel ratio may be obtained for the mobile terminal, and thus a larger area may be enabled to display information.

Figure 1B:
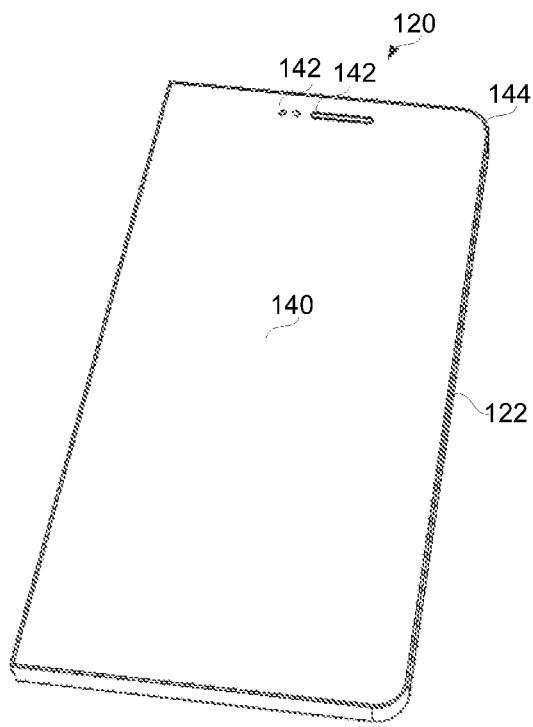
FIG. 1B is a block diagram illustrating a mobile terminal according to another exemplary embodiment.

FIG. 1B is a block diagram illustrating a mobile terminal according to another exemplary embodiment. The mobile terminal may be a smart mobile phone or another electronic device capable of mobile communication. The mobile terminal may include a frame body 120, a touch screen 140, and electronic components (e.g., electronic circuits, not shown) enclosed in the frame body.

The frame body 120 may be in shape of a hexahedron, and some edges or corners of the hexahedron may be arc-chamfered. The frame body 120 may include a middle frame 122. A front surface of the frame body 120 may be in shape of a rounded rectangle or a right-angled rectangle.

The touch screen 140 may be on the front surface of the frame body 120 and attached onto the middle frame 122. The touch screen 140 may cover the entire area of the front surface except for a predetermined area. The small predetermined area may be a small area so that it is surrounded by the touch screen. For example, the predetermined area may be an exposure area for additional electronic devices provided on the front surface of the frame body 120. The additional electronic devices may be those electronic devices other than the touch screen, provided on the front surface of the frame body. For example, the additional electronic devices may include a front camera, a speaker, a microphone, a light sensor, a proximity sensor and/or a signal light. In other words, there is no traditionally upper forehead area or lower button area on the front surface of the frame body 120. In the present disclosure, both the traditional areas for the forehead area and the lower button area are covered by the touch screen 140.

Alternatively, the exposure area may include at least one exposure opening 142, or the exposure area may be the at least one exposure opening. In the present embodiment, three exposure openings 142 are exemplarily illustrated in FIG. 1B, which are, from left side to right side of the front surface of the frame body 120, a light hole corresponding to the proximity sensor, a light hole corresponding to the front camera and a sound hole corresponding to the speaker. Both of the light holes may be in shape of a circle, while the sound hole corresponding to the speaker may be in shape of a strip.

In alternative embodiments, the number of the exposure openings may be determined depending on the number of the additional electronic devices provided on the front surface of frame body, rather than being limited. There is no limit applied on number, type or position of the additional electronic devices. Alternatively, each exposure opening may correspond to one of the additional electronic devices, that is, the exposure openings correspond to the additional electronic devices one by one. Alternatively, one exposure opening may correspond to two or more of the additional electronic devices, that is, the exposure opening may be shared by a plurality of electronic devices. In other words, there is at least one exposure opening corresponding to two or more of the additional electronic devices. The exposure opening may include through holes running through the touch screen 140, and may include non-through holes with light permeability or sound permeability.

Alternatively, the touch screen 140 may include a slim bezel 144. The slim bezel 144 may be used to accommodate bezel adhesive and/or marginal touch circuit. The marginal touch circuit may be provided in a structure of Cs-on-gate type of Cs-on-common type.

Alternatively, both corners adjoined by one edge of the touch screen may be right-angled, while the other two corners may be right-angled or round-angled. According to an exemplary embodiment, two corners adjoined by an edge where the marginal touch circuit may be are right-angled, so as to facilitate accommodating the marginal touch circuit at the edge. The edge where the marginal touch circuit is provided may be any one of upper edge, lower edge, left edge and right edge. However, an example in which the edge is left edge is illustrated by the drawing.

Alternatively, an OLED (Organic Light-Emitting Diode) display may be adopted as the touch screen 140.

The mobile terminal may further include the electronic exponents, such as a touch integrated circuit (not shown in the drawing) connected with the touch screen 140 and a processor (not shown in the drawing) connected with the touch integrated circuit.

As described above, in the mobile terminal according to the present embodiment, remaining area except the predetermined area on the whole of front surface of the frame body is covered by the touch screen without providing the upper forehead area and the lower button area thereon, so that a higher screen-to-bezel ratio may be obtained for the mobile terminal, and thus a larger area may be enabled to display information.

In the mobile terminal according to the present embodiment, with provision of the exposure openings, the additional electronic devices such as front camera, speaker, microphone and the like can function normally through the exposure openings, and fit well with the touch screen which is covered over its whole of front surface.

Figure 1C:
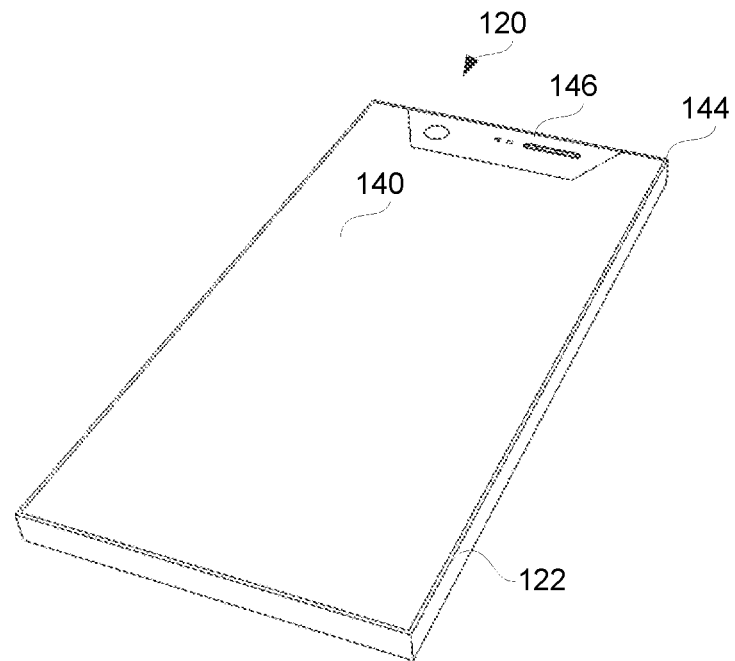
FIG. 1C is a block diagram illustrating a mobile terminal according to another exemplary embodiment.

FIG. 1C is a block diagram illustrating a mobile terminal according to another exemplary embodiment. The mobile terminal may be a smart mobile phone or another electronic device capable of mobile communication. The mobile terminal may include a frame body 120, a touch screen 140, and electronic components (e.g., electronic circuits, not shown) enclosed in the frame body.

The frame body 120 may be in shape of a hexahedron, and some edges or corners of the hexahedron may be arc-chamfered. The frame body 120 may include a middle frame 122. A front surface of the frame body 120 may be in shape of a rounded rectangle or a right-angled rectangle.

The touch screen 140 may be on the front surface of the frame body 120 and attached onto the middle frame 122, and the touch screen 140 may cover a remaining area except a predetermined area on the front surface of the frame body 120. The predetermined area may be an exposure area for additional electronic devices provided on the front surface of the frame body 120. The additional electronic devices may be those electronic devices other than the touch screen provided on the front surface of the frame body, and may include at least one of a front camera, a speaker, a microphone, a light sensor, a proximity sensor and a signal light. In other words, there is no upper forehead area or lower button area on the front surface of the frame body 120, while both the forehead area and the lower button area are covered by the touch screen 140.

Alternatively, the exposure area may be a gap area 146 formed along an edge of the touch screen 140. In the present embodiment, one gap area 146 is exemplarily illustrated in FIG. 1C, which is formed along a straight edge (upper edge) of the touch screen 140. The gap area 146 may be in shape of an inverted trapezoid. Alternatively, the gap area 146 may be formed in other shapes.

Alternatively, the gap area 146 may correspond to respective additional electronic device. For example, the gap area 146 may be provided with a front camera, a speaker, a microphone, a light sensor, a proximity sensor and a signal light therein. There is no limit on the number or type of the additional electronic device.

Alternatively, the touch screen 140 may include a slim bezel 144. The slim bezel 144 may be used to accommodate bezel adhesive and/or marginal touch circuit. The marginal touch circuit may be provided in a structure of Cs-on-gate type of Cs-on-common type.

Alternatively, four corners of the touch screen 140 may be right-angled.

Alternatively, an OLED (Organic Light-Emitting Diode) display may be adopted as the touch screen 140.

The mobile terminal may further include the electronic exponents, such as a touch integrated circuit (not shown in the drawing) connected with the touch screen 140 and a processor (not shown in the drawing) connected with the touch integrated circuit.

As described above, in the mobile terminal according to the present embodiment, remaining area except the predetermined area on the whole of front surface of the frame body is covered by the touch screen without providing the upper forehead area and the lower button area thereon, so that a higher screen-to-bezel ratio may be obtained for the mobile terminal, and thus a larger area may be enabled to display information.

In the mobile terminal according to the present embodiment, with provision of the gap area, the additional electronic devices such as front camera, speaker, microphone and the like can function normally through the gap area, and fit well with the touch screen which is covered over its whole of front surface.

Figure 1D:
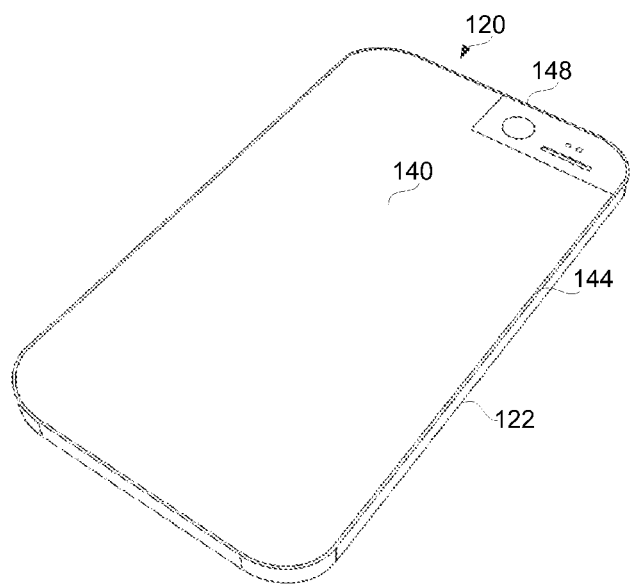
FIG. 1D is a block diagram illustrating a mobile terminal according to another exemplary embodiment.

Moreover, it should be noted that, as another possible implementation mode, the gap area 146 may be formed along a corner edge between two straight edges of the touch screen 140, as shown in FIG. 1D. An upper-right corner is illustrated in FIG. 1D as the corner edge, but it also could be an upper-left corner, a lower-left corner or a lower-right corner, and the present embodiment is not limited thereto. Alternatively, the four corners of the touch screen 140 may be round-angled. In this case, the marginal touch circuit may be provided in an arc arrangement. Otherwise, a length of the marginal touch circuit may be shorter than that of the edge of the touch screen on that side. Moreover, the marginal touch circuit may be provided by other possible processes.

Figure 2A:
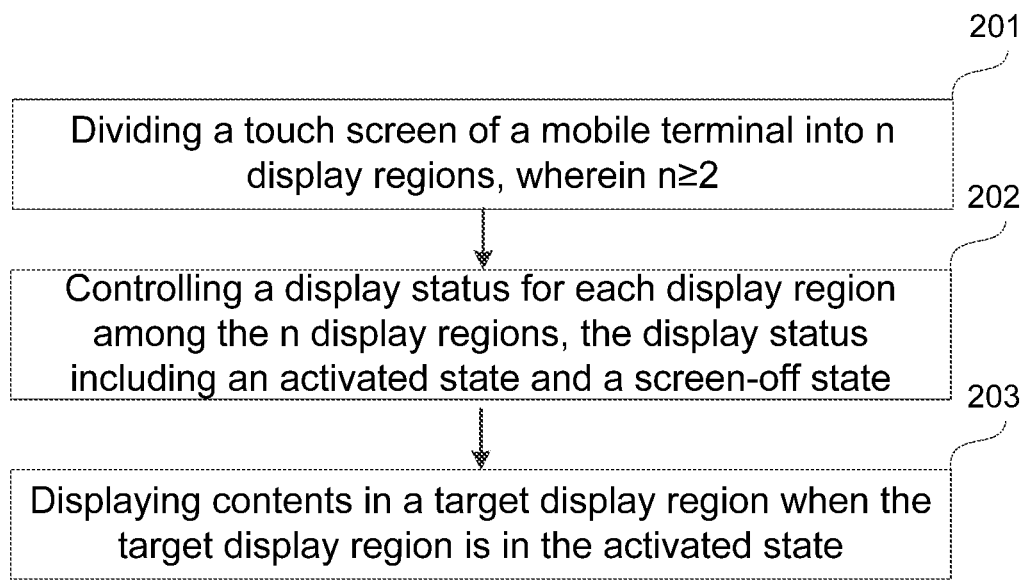
FIG. 2A is a flow chart illustrating a method for controlling display according to an exemplary embodiment.

FIG. 2A is a flow chart illustrating a method for controlling display according to an exemplary embodiment. The method for controlling display according to the present embodiment is exemplarily illustrated by being applied in the mobile terminal illustrated by any one of FIGS. 1A-1D. The method may include following steps operated by the mobile terminal.

In step 201, dividing the touch screen into n display regions, wherein n≥2.

The n display regions may respectively be sub-regions of the touch screen and may not overlap with each other, so that a sum area of the n display regions is equal to or smaller than an area of the touch screen. The n display regions are of the same in shape and area with each other. Alternatively, at least one of the n display regions is different from remaining display regions in shape and/or area. The display region may be in rectangle shape, for example.

Figure 2B:
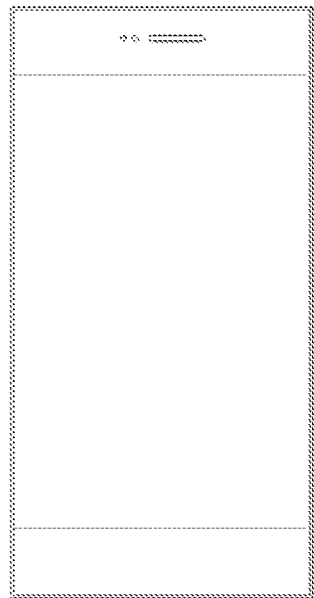
FIGS. 2B-2D are schematic diagrams illustrating three division manners of display regions according to the embodiment shown in FIG. 2A.

As shown in FIG. 2B, the n display regions may include 3 display regions with a same width and different heights.

Figure 2C:
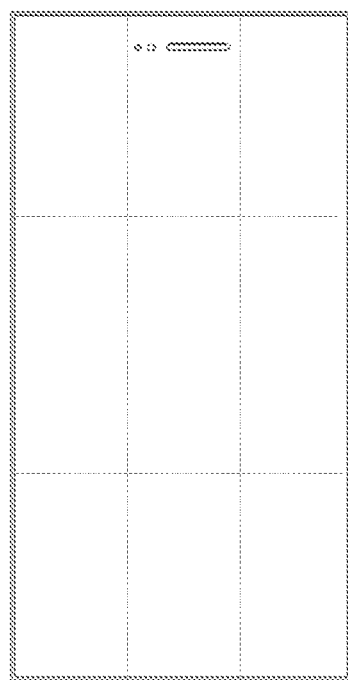

As shown in FIG. 2C, the n display regions may include 9 display regions with a same width and a same height.

Figure 2D:
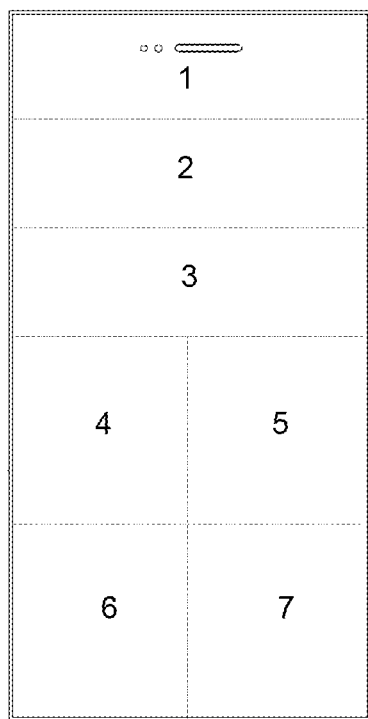

As shown in FIG. 2D, the n display regions may include 7 display regions. Among these, display regions numbered with 1 to 3 are same in width and height, while display regions numbered with 4 to 7 are same in width and height.

In step 202, controlling a display status for each display region among the n display regions, the display status including an activated state and a screen-off state.

The activated state may be a state in which display content is displayed. Basic elements of the display content may include at least one of text, picture, animation, icon and/or user interface. Content types of the display content may include: running condition information, icon information of application program, virtual button information, desktop widget and the like.

The screen-off state may be a state in which the screen is turned off without displaying any content. Alternatively, a display region in the screen-off state may be also able to receive touch signal.

The mobile terminal may individually and/or respectively control whole or part of the n display regions into the activated state, and may individually and/r respectively control whole or part of the n display regions into the screen-off state.

In step 203, controlling display content of a display region in the activated state.

The mobile terminal may further individually control the display content of a display region in the activated state. Each of the n display regions is configured to display contents of an individually predetermined content type, such as video content, un-processed information (e.g., emails) of the mobile terminal, icons of an application.

As described above, in the method for controlling display according to the present embodiment, the touch screen of the mobile terminal is divided into different display regions, and display status of each display region as well as display content of display regions in the activated state may be controlled. Accordingly, both display status and display content of each display region can be controlled separately to achieve diversity of display mode and a higher efficiency of screen utilization. Moreover, display regions in the screen-off state may enable electricity consumption to be saved, and can be used as hand hold region of user so as to reduce possibility of false touch for the user.

There may be a plurality of implementation modes for the steps 202 and 203 described above. Some different embodiments will be described hereinafter.

Figure 3A:
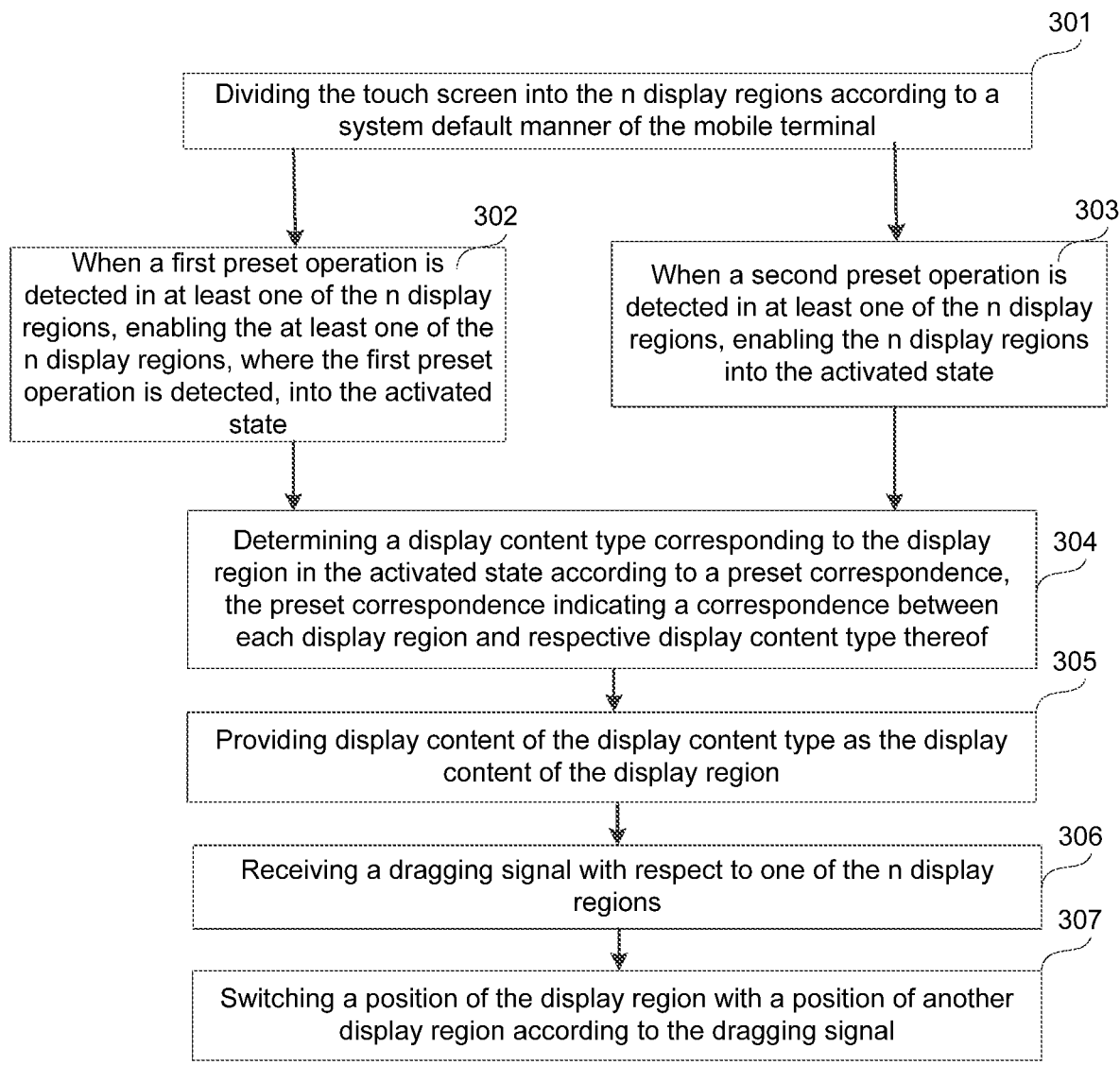
FIG. 3A is a flow chart illustrating a method for controlling display according to another exemplary embodiment.

FIG. 3A is a flow chart illustrating a method for controlling display according to an exemplary embodiment. The method for controlling display according to the present embodiment is exemplarily illustrated by being applied in the mobile terminal illustrated by any one of FIGS. 1A-1D. The method may include the following steps, performed by the mobile terminal.

In step 301, dividing the touch screen into n display regions according to a system default manner of the mobile terminal, wherein n≥2.

Figure 3B:
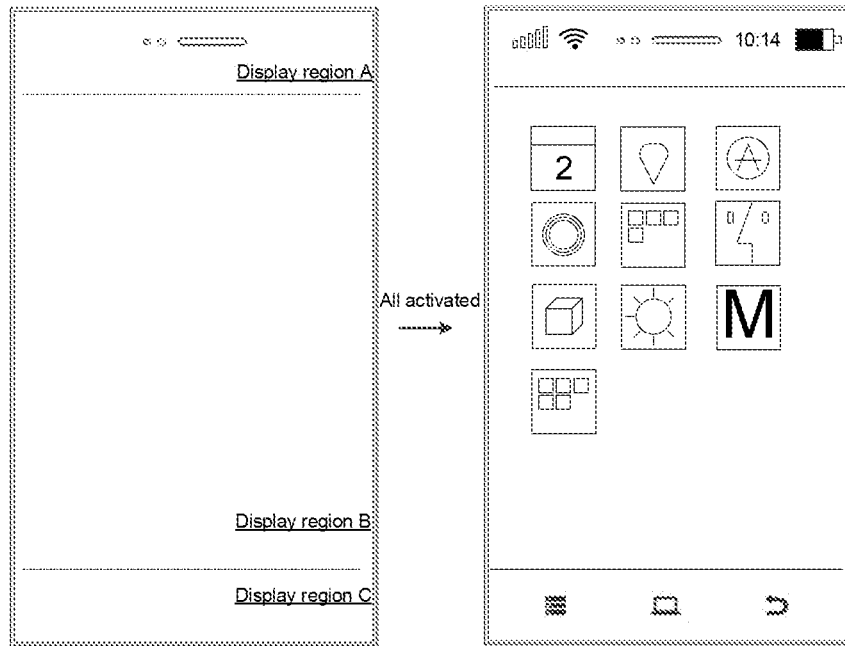
FIGS. 3B-3C are schematic diagrams illustrating interfaces when the method for controlling display according to the embodiment shown in FIG. 3A is implemented.

Take n=3 for example, the mobile terminal may divide the touch screen into 3 display regions according to the system default manner. As shown in FIG. 3B, the display regions may include a display region A, a display region B, and a display region C.

The mobile terminal may include an operation system with preset and/or pre-stored correspondence to indicate each display region with its respective displayed content type (e.g., the correspondence defines the relationship between each display region and the corresponding displayed content type). The preset correspondence may be preset by the operating system or customized by the user.

For example, a display content type corresponding to the display region A is running condition information of the mobile terminal. The running condition information may include information indicating and/or about a name and/or type of carrier that the mobile terminal is currently using, a battery condition, mobile network signal strength and the like.

A display content type corresponding to the display region B is icon information of application programs in the mobile terminal.

A display content type corresponding to the display region C is virtual button control of the mobile terminal.

In step 302, when the mobile terminal detects a first preset operation in a target display region, enabling the activated state in the target display regions, wherein the target display region includes at least one of the n display regions.

The first preset operation may include a leftwards sliding gesture, a rightwards sliding gesture, a downwards sliding gesture and the like. The first preset operation may be preset by the operating system or customized by the user.

For example, in an initial condition, the n display regions are in the screen-off state. If the user wants to set the display region A as the activated state, he/she may perform a downwards sliding gesture (e.g., sliding downwards on the touch screen) in the display region A. The mobile terminal enables the display region A into the activated state according to the downwards sliding gesture.

In another example, in the initial condition, the n display regions are in the screen-off state. If the user wants to set two of the n display regions as the activated state, he/she may perform a continuous downwards sliding gesture in the two display regions. The mobile terminal enables the two display region into the activated state according to the downwards sliding gesture.

In step 303, when the mobile terminal detects a second preset operation in the target display region, enabling the n display regions into the activated state.

The second preset operation may include an arc gesture, a polyline gesture and the like. The second preset operation may be preset by the operating system or customized by the user.

For example, in an initial condition, the n display regions are in the screen-off state. If the user wants to set the n display regions as the activated state, he/she may perform a polyline gesture (e.g., sliding a polyline on the touch screen) in the target display region, which may be at least one of the n display regions. The mobile terminal enables the n display regions into the activated state according to the polyline gesture.

The target display region may be a predetermined display region or may be any display region/regions of the n display regions. Alternatively, the mobile terminal may detect the first preset operation from other display regions of the n display regions and activate the target display region into the activated state.

In step 304, determining a display content type corresponding to the display region in the activated state according to a preset correspondence, the preset correspondence indicating a correspondence between each display region and respective display content type thereof.

When one display region is enabled into the activated state, the mobile terminal may determine the display content type of the display region according to the preset correspondence.

For example, when the display region A is enabled into the activated state, the mobile terminal may determine that the display content type corresponding to the display region A is: running condition information. Same applies to other display regions.

In step 305, providing display content of the display content type as the display content of the display region.

For example, the mobile terminal may acquire current running condition information of the mobile terminal, and provide and/or display the current running condition information as the display content on the display region A.

Figure 3C:
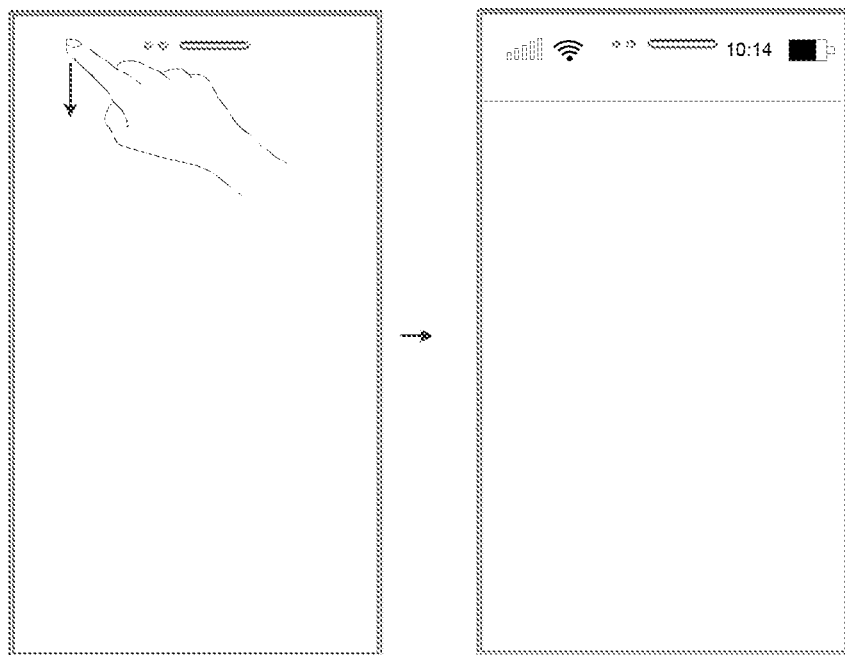

In the example illustrated in FIG. 3C, if the user wants to check current time and current battery condition of the mobile terminal, he/she may perform a downwards sliding gesture from top of the mobile terminal. Accordingly, the mobile terminal may enable the display region A into the activated state (e.g., activate the display region A), and provide the current running condition information on the display region A. During this period, the display regions B and C may be kept in the screen-off state and/or their respective original operation states.

In step 306, receiving a dragging signal with respect to one of the n display regions.

Alternatively, the user may change a display position of each display region. If the user wants to change a display position of a display region, he/or she may directly drag the display region to a desired position.

Accordingly, the mobile terminal may receive the dragging signal with respect to the one of the n display regions from the user.

In step 307, switching a position of the display region with a position of another display region according to the dragging signal.

After receiving the dragging signal, the mobile terminal may switch a position of the display region being dragged with that of another display region.

For example, when the display region A is dragged to a position initially taken by the display region C, the mobile terminal may switch the display position of the display region C with that of the display region A (e.g., the mobile terminal may move the display region A into the position that the display region C initially takes).

Alternatively, if the user performs certain predetermined operation, such as clicking certain times (single click, double click etc.), on a certain display region in the activated state, the mobile terminal may zoom in the target display region to be displayed in full screen. For a display region displayed in full screen, the mobile terminal may zoom out it to be displayed in its original size according to another predetermined action, such as a two-finger pinch gesture of the user.

As described above, in the method for controlling display according to the present embodiment, the touch screen of the mobile terminal is divided into different display regions, and display status of each display region as well as display content of display regions in the activated state may be controlled; accordingly, both display status and display content of each display region can be controlled separately, thus diversity of display mode and a higher efficiency of screen utilization can be achieved. Moreover, display regions in the screen-off state may enable electricity consumption to be saved, and can be used as hand hold region of user so as to reduce possibility of false touch for the user.

In the method for controlling display according to the present embodiment, the display position of a display region may be switched according to a dragging gesture of the user. Accordingly, a flexible display mode may be achieved.

Figure 4A:
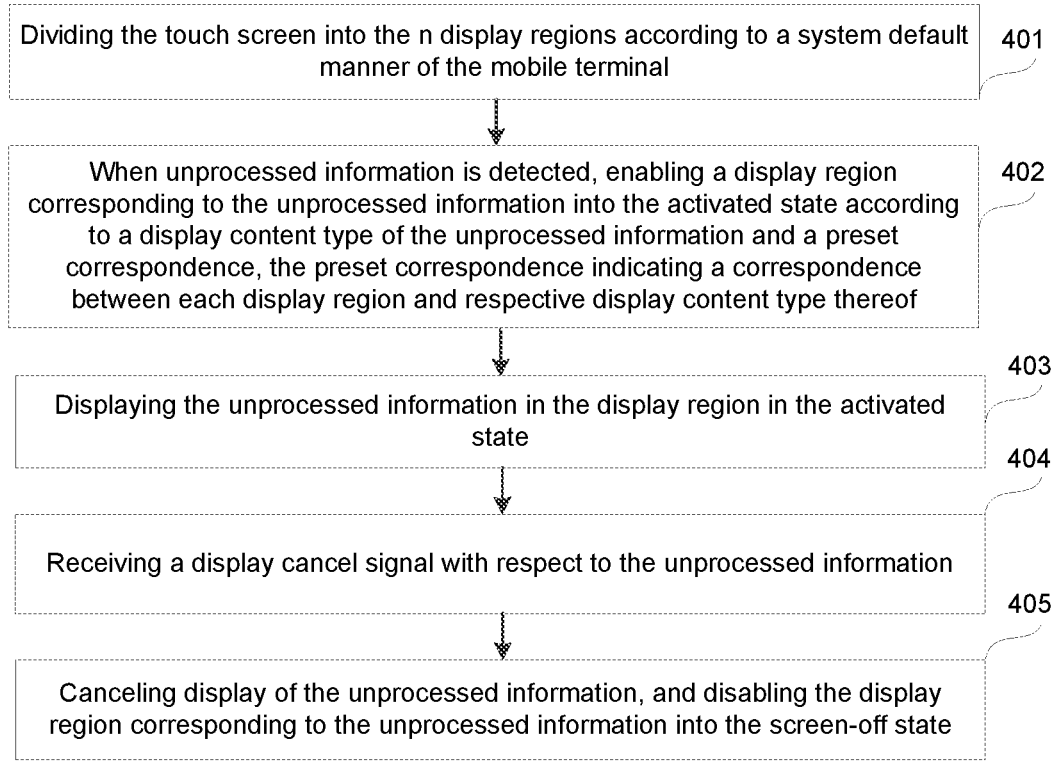
FIG. 4A is a flow chart illustrating a method for controlling display according to another exemplary embodiment.

FIG. 4 is a flow chart illustrating a method for controlling display according to another exemplary embodiment. The method for controlling display according to the present embodiment is exemplarily illustrated by being applied in the mobile terminal illustrated by any one of FIGS. 1A-1D. The method may include following steps performed by the mobile terminal.

In step 401, dividing the touch screen into n display regions according to a system default manner of the mobile terminal, wherein n≥2.

Figure 4B:
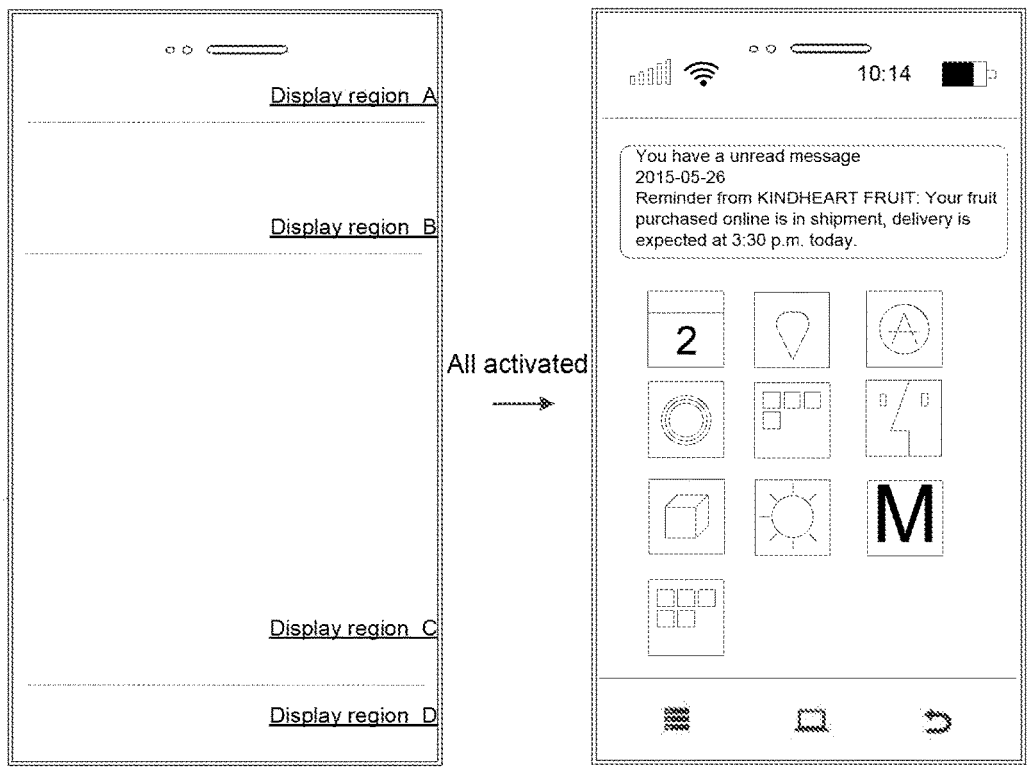
FIGS. 4B-4C are schematic diagrams illustrating interfaces when the method for controlling display according to the embodiment shown in FIG. 4A is implemented.

Take n=4 for example, the mobile terminal may divide the touch screen into 4 display regions according to the system default manner. As shown in FIG. 4B, the display regions may include a display region A, a display region B, a display region C and a display region D.

The mobile terminal may include an operating system that has preset correspondences stored therein. The present correspondences may indicate and/or associate each display region with its respective display content type. The preset correspondences may be preset by the operating system or customized by the user.

For example, running condition information of the mobile terminal may be a display content type corresponding to the display region A. The running condition information may include information indicating and/or about a name and/or type of the carrier that the mobile terminal currently is using, a battery condition, mobile network signal strength and the like.

Unprocessed information may be a display content type corresponding to the display region B. The unprocessed information may include unread short message and notification message.

Icon information of application programs installed in the mobile terminal may be a display content type corresponding to the display region C.

Virtual button control may be a display content type corresponding to the display region D. The virtual button control may include at least one of menu button control, Home button control and/or return button control.

In step 402, when the mobile terminal detects and/or receives unprocessed information, enabling a target display region corresponding to the unprocessed information into the activated state according to a display content type of the unprocessed information and a preset correspondence (e.g., treating the display region corresponding to the unprocessed information as the target display region and activate the target display region), the preset correspondence indicating a correspondence between each display region and respective display content type thereof.

For example, when the mobile terminal receives unprocessed information, such as a new short message or a new mail, the mobile terminal may enable and/or turn the display B (the target display region) into the activated state according to the preset correspondence.

In step 403, displaying the unprocessed information in the target display region under the activated state.

The mobile terminal may display the unprocessed information in the display region B.

In step 404, receiving a display cancel signal with respect to the unprocessed information.

After the user checks or deals with the unprocessed information, the display cancel signal may be sent to and received by the mobile terminal. For example, after processing the unprocessed information, the user may slide on the display region B to drag the unprocessed information displayed thereon out of the display region B. The dragging performance may generate the display cancel signal on the screen of the mobile terminal, which may be received by the mobile terminal.

In step 405, canceling display of the unprocessed information, and disabling the activate state of the target display region to turn it into the screen-off state.

In this step, the mobile terminal may cancel the display of the unprocessed information, and disables the activate state of the target display region corresponding to the unprocessed information, thereby turning the target region into the screen-off state.

Figure 4C:
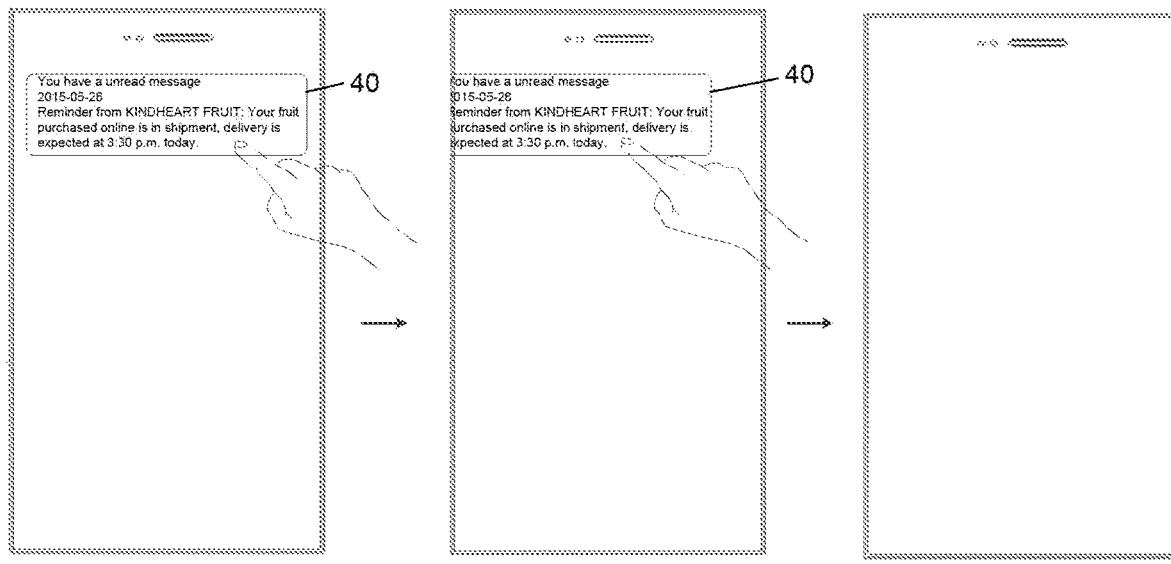

In the example illustrated in FIG. 4C, after receiving a new short message 40, the mobile terminal automatically enables the display region B corresponding to the new short message 40 into the activated state, and displays the new short message 40 in the display region B. Upon reading the new short message 40, the user may perform a leftwards sliding gesture (e.g., performing a sliding action towards left on the touch screen of the mobile terminal) on the new short message 40, thus cancel the display of the new short message 40. Meanwhile, the mobile terminal may disable the display region B corresponding to the new short message 40 and turns it into the screen-off state.

Alternatively, if the user performs certain predetermined operation, such as clicking certain times (single click, double click etc.), on a certain display region (e.g., the target display region or other predetermined region) in the activated state, the mobile terminal may zoom in the target display region to be displayed in full screen. For a display region displayed in full screen, the mobile terminal may zoom out it to be displayed in its original size according to another predetermined action, such as a two-finger pinch gesture of the user.

As described above, in the method for controlling display according to the present embodiment, if there is unprocessed information, only a display region corresponding to the unprocessed information is enabled into the activated state, and the display of the unprocessed information can be canceled according to a dragging gesture of the user. Accordingly, upon emergence of unprocessed information, the user may focus on checking the unprocessed information without being disturbed by other display content. Moreover, other display regions may be kept in the screen-off state so as to enhance the effect of power saving.

Figure 5A:
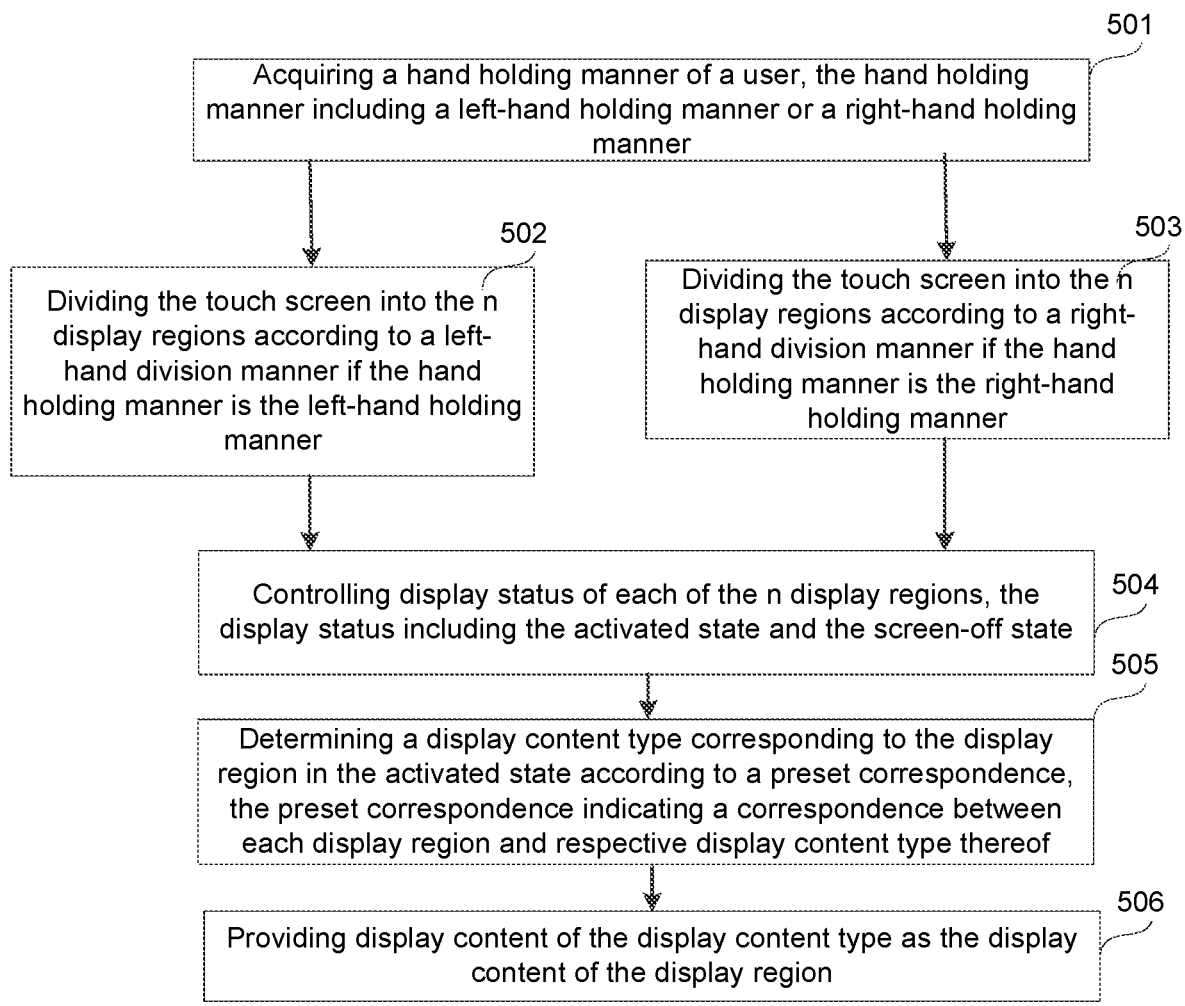
FIG. 5A is a flow chart illustrating a method for controlling display according to another exemplary embodiment.

FIG. 5A is a flow chart illustrating a method for controlling display according to another exemplary embodiment. The method for controlling display according to the present embodiment is exemplarily illustrated by being applied in the mobile terminal illustrated by any one of FIGS. 1A-1D. The method may include following steps performed by the mobile terminal.

In step 501, acquiring a hand holding manner of a user when the user is holding the mobile terminal, wherein the hand holding manner including a left-hand holding manner or a right-hand holding manner.

The mobile terminal may acquire the hand holding manner of the user via a hardware component provided in the frame body. The step may be implemented in various manners.

As a first implementation manner, the mobile terminal may acquire a tilt angle thereof via a built-in sensor. Through the tilt angle, the mobile terminal may determine if the mobile terminal is holding by a user's left hand or right hand. For example, if the mobile terminal determines that the screen of the mobile terminal is facing towards the user's face from the user's left side, i.e., a vector perpendicular to the screen is pointing towards the user's face from left, so that an component of the vector at a direct parallel to the face points from the user's left side to the right side, then the mobile terminal may determine that the tilt angle is a tilt angle inclining to the left. When the tilt angle is greater than a preset angle, the mobile terminal may determine the hand holding manner of the user as the left-hand holding manner. Similarly, if the mobile terminal determines that the screen of the mobile terminal is facing towards the user's face from the user's right side, i.e., the vector perpendicular to the screen is pointing towards the user's face from right, so that an component of the vector at the direct parallel to the face points from the user's right side to the left side, then the mobile terminal may determine that the tilt angle is a tilt angle inclining to the right. When the tilt angle is greater than a preset angle, the mobile terminal may determine the hand holding manner of the user as the right-hand holding manner.

As a second implementation manner, the mobile terminal may monitor a tilt angle thereof via a built-in sensor; if the tilt angle varies from inclining to the left to inclining to the right, the mobile terminal may determine the hand holding manner of the user as the right-hand holding manner; and if the tilt angle varies from inclining to the right to inclining to the left, the mobile terminal may determine the hand holding manner of the user as the left-hand holding manner.

As a third implementation manner, if a preset gesture is received at a left side predetermined area of the touch screen, the mobile terminal may determine the hand holding manner of the user as the left-hand holding manner; and if a preset gesture is received at a right side predetermined area of the touch screen, the mobile terminal may determine the hand holding manner of the user as the right-hand holding manner.

As a fourth implementation manner, the mobile terminal may acquire a press image (i.e., a fingerprint image of a user) on the touch screen; if the press image matches a sample image of left thumb, the mobile terminal may determine the hand holding manner of the user as the left-hand holding manner; and if the press image matches a sample image of right thumb, the mobile terminal determines the hand holding manner of the user as the right-hand holding manner.

In step 502, dividing the touch screen into n display regions according to a left-hand division manner when the hand holding manner of the user is the left-hand holding manner, wherein n≥2.

The n display regions may be obtained through division according to a left-hand division manner as follows.

The mobile terminal may divide the touch screen thereof into the n display regions according to operational distance from the left thumb.

The mobile terminal may establish a preset correspondence between various display content types and the n display regions according to a priority order. For example, the priority order may be "priority of virtual button control>priority of unprocessed information or notification information>priority of icon information of application programs>priority of system running information".

The display content type having a higher priority may correspond to a display region with a smaller operational distance from the left thumb (i.e., closer to the left thumb), and the display content type having a lower priority may correspond to the display region with a greater operational distance (i.e., farther to the left thumb). Further, the display region with a higher priority may take larger area than a display region with a lower priority. As a result, the user may feel easier to use the left thumb to reach and click a display area with higher priority than a display with lower priority.

Figure 5B:
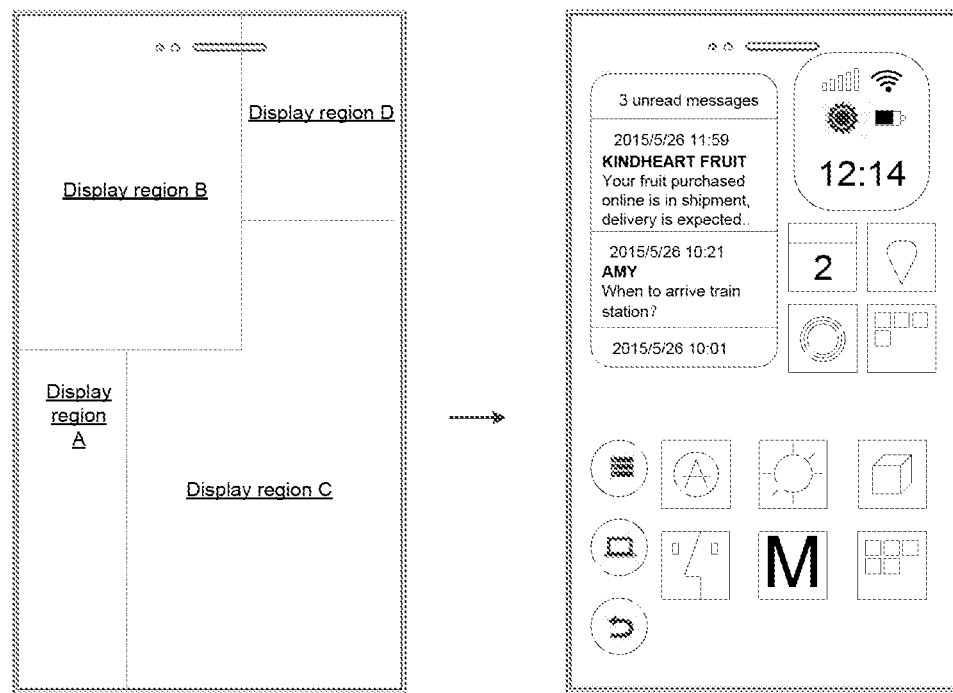
FIGS. 5B-5C are schematic diagrams illustrating interfaces when the method for controlling display according to the embodiment shown in FIG. 5A is implemented.

In an example illustrated by FIG. 5B, the touch screen is divided into 4 display regions with different operational distances from the left thumb, that is, a display region A, a display region B, a display region C and a display region D. Among these display regions, the display region A is the closest to the left thumb and is used to display the virtual button control; the display region B is the second closest region to the left thumb and is used to display the unprocessed information or notification information; the display region C is farer from the left thumb than display region B, therefore is used to display the icon information of application programs; and the display region D is the farthest to the left thumb, and therefore is used to display the system running information.

Additionally, the mobile terminal may recognize different users or different handholding manners and individualize the arrangement of the n display region according to the user's identity. For example, the mobile terminal may provide different account for different users. It may ask a user to input user name and password or scan his/her finger to verify his/her identity before use. When the different user logs in his/her account, the mobile terminal may display the n display region under different style and/or manner according to the user's identity. The style and/or manner that the n display region is presented to the user may be preset by the user or may based on the user's habits. For example, in FIG. 5B, the mobile terminal may collect the historical operation data of a user on the screen and determine that when the user touches area B, 90% of the times he/she touches an area along a direction of 15°-18° from the vertical edge of the screen and 10-13 cm from the lower left corner of the screen. Accordingly, the mobile terminal may arrange the most frequently touched area as the center of the area B.

The mobile terminal may also display individualize the arrangement of the n display region according to the handholding manners that a user holds the mobile terminal. For example. To this end, the mobile terminal may recognize the hand holding manner of different users and display different display regions according to the user's identity. Or, the mobile terminal may remember different hand holding manners of a same user and display different display regions according to the different hand holding manners.

In step 503, dividing the touch screen into the n display regions according to a right-hand division manner if the hand holding manner of the user is the right-hand holding manner.

The mobile terminal may divide the touch screen thereof into the n display regions according to a right-hand division manner as follows.

The n display regions may be obtained through division according to operational distance from the right thumb.

The mobile terminal may establish a preset correspondence between various display content types and the n display regions according to a priority order. For example, the priority order may be "priority of virtual button control>priority of unprocessed information or notification information>priority of icon information of application programs>priority of system running information".

The display content type having a higher priority may correspond to the display region with a smaller operational distance, and the display content type having a lower priority may correspond to the display region with a greater operational distance.

Figure 5C:
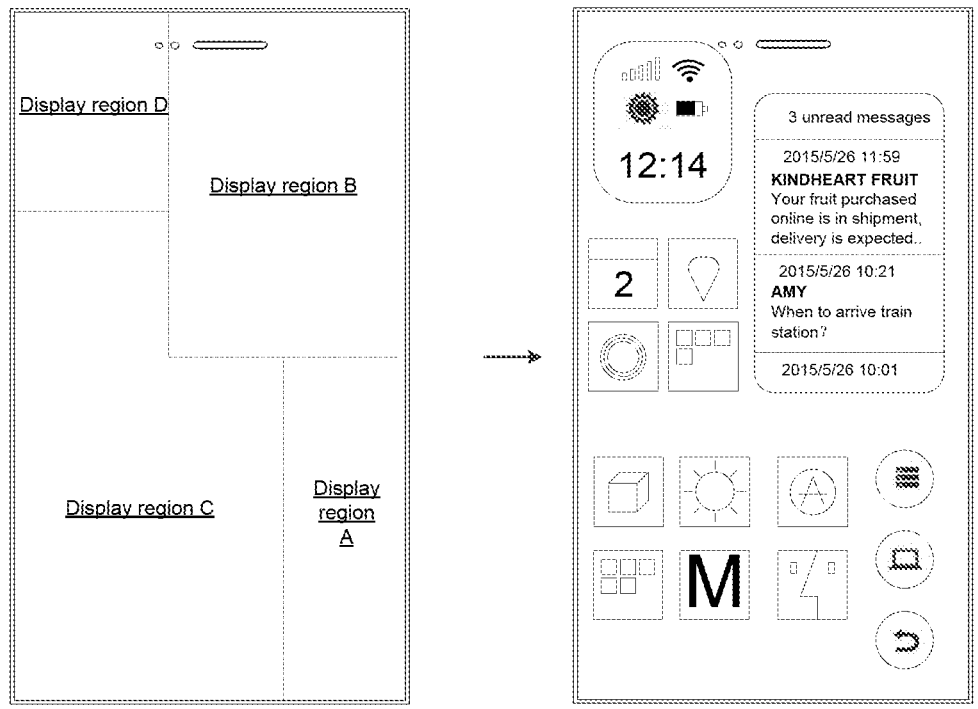

In an example illustrated by FIG. 5C, the touch screen is divided into 4 display regions with different operational distances from the right thumb, that is, a display region A, a display region B, a display region C and a display region D. Among these display regions, the display region A is the closest to the right thumb and is used to display the virtual button control; the display region B is the second closest display region to the right thumb, and is used to display the unprocessed information or notification information; the display region C is farer from the right thrum than the display region B, therefore is used to display the icon information of application programs; and the display region D is the farthest display region to the right thumb, therefore is used to display the system running information.

It should be noted that, FIGS. 5B and 5C are only for illustration. The disclosure is not limited to any specific division manner of the left-hand and right-hand division manner, as long as the left-hand division manner facilitates operations of left hand holding and the right-hand division manner facilitates operations of right hand holding.

In step 504, controlling display status of each of the n display regions, the display status including an activated state and a screen-off state.

This step may be implemented in a control manner similar to that described in the step 302, 303 or 402.

For example, the user may perform a downwards sliding gesture so that the mobile terminal enables a corresponding display region into the activated state.

In step 505, based on a preset correspondence, determining a display content type corresponding to a target display region, wherein the target display region is at least one of the n display region and is in the activated state, the preset correspondence indicating a correspondence between each display region and respective display content type thereof.

The target display region may be at least one of the n display regions of the touch screen that is in the activated state, and the mobile terminal may determine the display content type corresponding to the target display region according to the preset correspondence. The preset correspondence may be preset by the operating system or customized by the user.

In step 506, providing display content of the display content type as the display content of the display region.

Alternatively, if the user performs certain predetermined operation, such as clicking certain times, on a certain display region in the activated state, such as the target display region or other predetermined display region on the touch screen, the mobile terminal may zoom in the target display region in full screen. For a display region displayed in full screen, the mobile terminal may zoom out it to be displayed in its original size according to another predetermined operation, such as a two-finger pinch gesture of the user.

As described above, in the method for controlling display according to the present embodiment, the hand holding manner of the user is analyzed automatically, and the division manner of display regions is adjusted dynamically according to the hand holding manner of the user. Accordingly, arrangement of display regions displayed by the mobile terminal fits better with operation habits of the user, and thus efficiency of user operations can be improved.

Figure 6A:
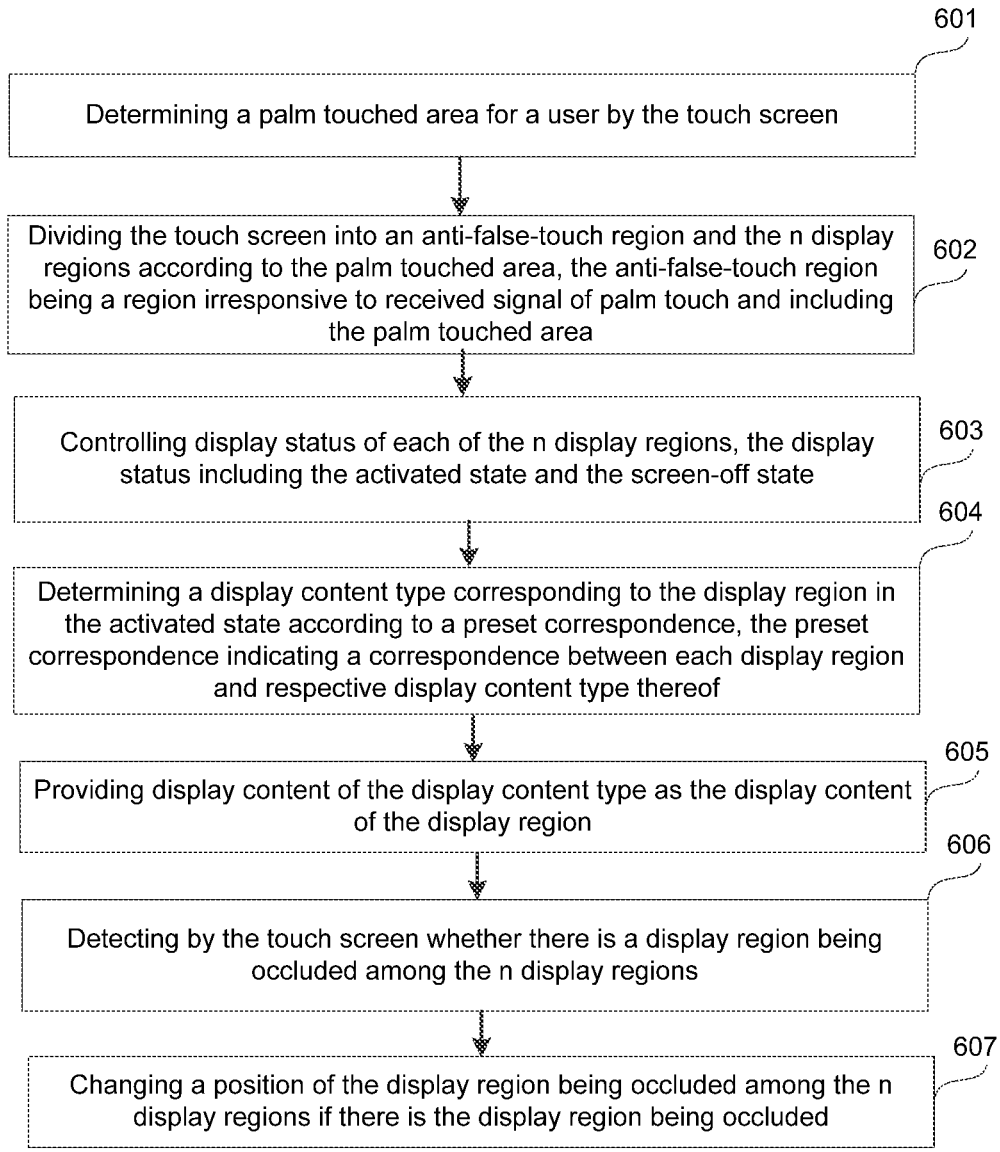
FIG. 6A is a flow chart illustrating a method for controlling display according to another exemplary embodiment.

FIG. 6A is a flow chart illustrating a method for controlling display according to another exemplary embodiment. The method for controlling display according to the present embodiment is exemplarily illustrated by being applied in the mobile terminal illustrated by any one of FIGS. 1A-1D. The method may include following steps performed by the mobile terminal.

In step 601, determining a palm touched area for a user by the touch screen.

Since the mobile terminal does not have a frame on its screen, the whole front surface of the mobile terminal is covered by the touch screen. A consequence of this design is that when a user holds the mobile terminal, it is easy for the user to make a false operation.

In order to reduce a chance of false operations, upon sampling a touched area from the user by the touch screen, the mobile terminal may determine the palm touched area by analyzing shape, area and position of the touched area.

For example, with the left-hand holding manner, if the touched area is located at lower left side of the screen, has a shape of an ellipse or part of the ellipse and an area greater than a predetermined empirical area size of a finger tip, the mobile terminal may determine that the touch area is a palm touched area of the user.

In step 602, dividing the touch screen into an anti-false-touch region and n display regions according to the palm touched area, wherein n≥2 and the anti-false-touch region being a region including the palm touched area and irresponsive to received signal of palm touch.

Based on determination of the palm touched area, the mobile terminal configures a partial region including the palm touched area as the anti-false-touch region, which is irresponsive to received signal of palm touch.

The mobile terminal may further divide remaining area except the anti-false-touch region into the n display regions.

Figure 6B:
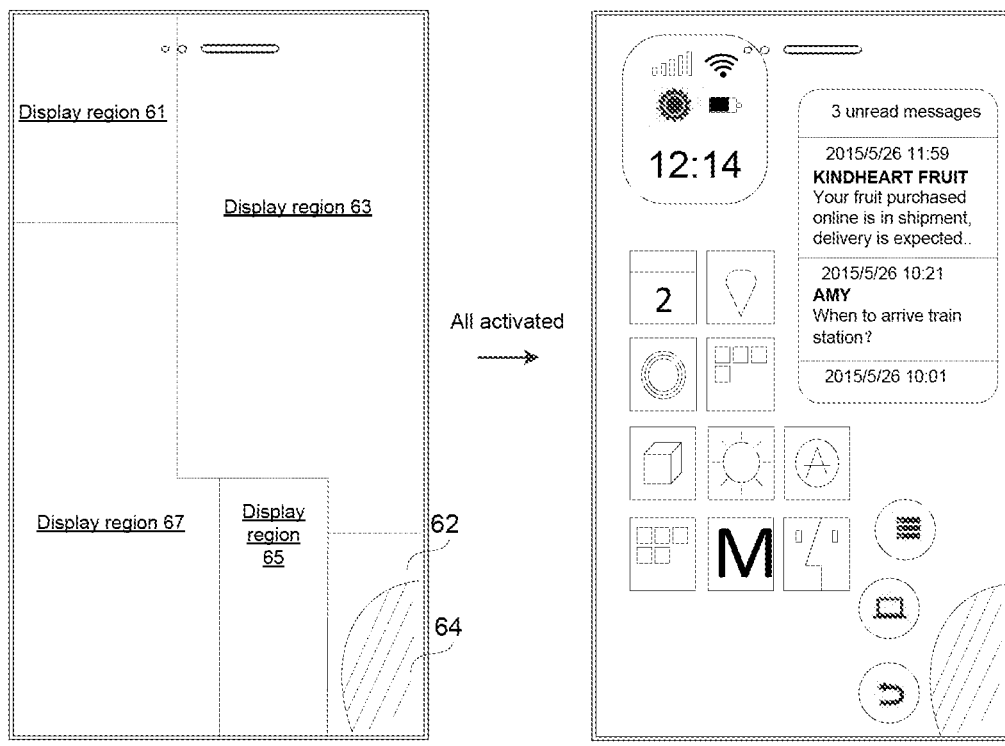
FIG. 6B is a schematic diagram illustrating interfaces when the method for controlling display according to the embodiment shown in FIG. 6A is implemented.

Referring to an example illustrated in FIG. 6B, a size of the anti-false-touch region 62 is relevant with that of the palm touched area 64. The mobile terminal may adjust the size of the anti-false-touch region 62 according to the size of the hand holding it. When the mobile terminal is held by a bigger hand, the anti-false-touch region 62 is bigger; when the mobile terminal is held by a smaller hand, the size of the anti-false-touch region 62 is smaller. Alternatively, the size of the anti-false-touch region 62 may be varied dynamically according to that of the palm touched area.

Moreover, the mobile terminal divides the remaining area except the anti-false-touch region 62 into 5 display regions. Among these 5 display regions, a display region 61 at upper left corner corresponds to a display content type of system running information; a display region 63 at upper right corner corresponds to a display content type of unprocessed information; a display region 65 at lower middle part corresponds to a display content type of virtual button control; and a display region 67 at lower left corner corresponds to a display content type of icon information of application programs.

In step 603, controlling display status of each of the n display regions, the display status including an activated state and a screen-off state.

For example, the user may perform a downwards sliding gesture so that the mobile terminal enables a corresponding display region into the activated state.

In step 604, determining a display content type corresponding to a target display region, wherein the target display region is a display region in the activated state according to a preset correspondence, and the preset correspondence indicates a correspondence between each display region and respective display content type thereof.

Upon enabling and/or activate the target display region into the activated state, the mobile terminal may determine a display content type of the target display region according to the preset correspondence.

In step 605, providing display content of the display content type as the display content of the target display region.

In step 606, detecting by the touch screen whether there is a display region being occluded among the n display regions.

Since the touch screen may be occluded (e.g., covered) by user fingers, the mobile terminal may determine those display regions being occluded from the n display regions through a floating touch detection function of the touch screen.

For example, if there is an occluding object above a display region and the display region is occluded over 2 seconds (a predetermined duration of time), the mobile terminal may determine the display region as an occluded display region.

In step 607, changing a position of the display region being occluded among the n display regions if there is the display region being occluded.

The mobile terminal may change the position of the display region being occluded in the touch screen, so as to facilitate the user to view the display region being occluded. Since two display regions before and after the change may be different from each other in shape and size, arrangement of each display region may be required to be adjusted after the change. For example, when the mobile terminal detects that a display region of the n display regions is occluded by an object for longer than a predetermined period of time, the mobile terminal may readjust the distribution of the n display regions, such as moving the position of the occluded display region so that the it is no longer occluded.

This step may be implemented in a plurality of exemplary manners.

for example, in a first manner, if there is an anti-false-touch region on the touch screen and a palm touched area disappears from the anti-false-touch region, the mobile terminal may revert the anti-false-touch region back to serve as one or more display regions or part of the one or more display region.

In a second manner, based on priority of each of the n display regions, the mobile terminal may move the occluded region into another region. For example, the mobile terminal may move the occluded region into and overlap a region with the lowest priority.

In a third manner, based on priority of each of the n display regions, the mobile terminal may switch the position of the occluded region with another region. For example, the mobile terminal may move the occluded region to a region with the lowest priority, and move the region with the lowest priority to the position that the occluded region originally taken.

As described above, in the method for controlling display according to the present embodiment, the anti-false-touch region is provided dynamically according to the palm touched area of the user. Accordingly, a chance of false touch from user palm onto the touch screen may be reduced, and thus normal operations can be achieved for the user even though the whole front surface of the mobile terminal is covered by the touch screen.

In the method for controlling display according to the present embodiment, a display position of occluded display region may be changed dynamically. Accordingly, more display content with higher priority can be viewed by the user even he/she occludes part of display regions.

Moreover, it should be noted that, free combination of the embodiments described above may be possible based on reasonable predict of those skilled in the art. For example, steps 306 and 307 may be introduced into the embodiment illustrated in FIG. 6A; steps 606 and 607 may be introduced into the embodiment illustrated in FIG. 3A.

Embodiments of an apparatus according to the disclosure will be described hereinafter, which can be used to implement the method according to those embodiments of the disclosure. For details omitted in the embodiments of apparatus according to the disclosure, please refer to the embodiments of method according to the disclosure.

Figure 10:
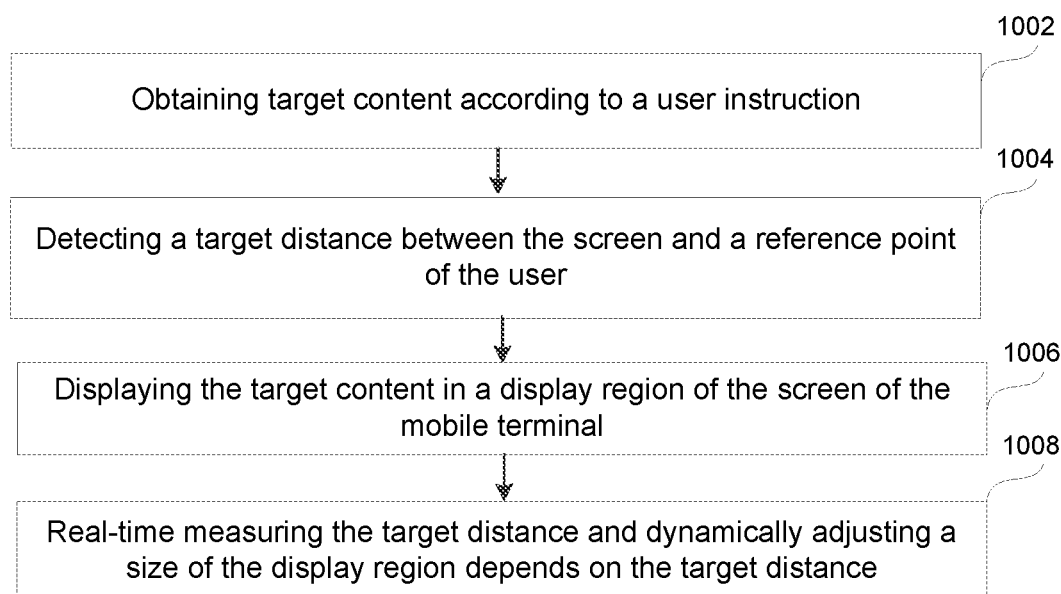
FIG. 10 is a flowchart illustrating a method for controlling display according to another exemplary embodiment.

FIG. 10 is a flowchart illustrating a method for controlling display according to another exemplary embodiment. The method may be implemented in the mobile terminal illustrated by any one of FIGS. 1A-1D, and the method may be combined in any other methods disclosed in the present disclosure. The method may include following steps performed by the mobile terminal.

Step 1002. Obtaining target content according to a user instruction.

When a user of the mobile terminal select certain content (i.e., the target content), the mobile terminal may display the target content on the display region of the screen. The content may be a message, a webpage, a video clip, or any other visual content.

Step 1004. Detecting a target distance between the screen and a reference point of the user.

The mobile terminal may activate a camera on the front surface thereof to recognize a reference point on the face of the user. For example, the reference may be the nose or the eyes of the user. The mobile terminal may further detect a distance (i.e., the target distance) between the screen and the reference point. For example, the mobile terminal may use an ultrasonic or invisible laser to detect the distance. Alternatively, the camera may include 2 lenses located on different locations of the screen and the mobile terminal may drive the 2 lens to take a picture of the user's face simultaneously. By comparing differences between the two pictures, the camera may determine the distance by using the difference between the screen and the reference point.

Step 1006. Displaying the target content in a display region of the screen of the mobile terminal.

The display region may be a portion of the screen. The mobile terminal may display the target content on the display region of the screen and display the remainder region on the screen black in order to save energy.

Step 1008. Real-time measuring the target distance and dynamically adjusting a size of the display region depends on the target distance.

The mobile terminal may keep measuring the target distance between the screen and the reference point of the user's face in real-time, and then dynamically adjusting the size of the display region on the screen accordingly.

When the user moves the screen towards his/her eyes, the mobile terminal may determine that the target distance becomes shorter. Accordingly, the display region may not be as big as before in order for the user to read the target content therein. Therefore, the mobile terminal may adjust to shrink the display region. The word font size or image size in the display region may also be adjusted smaller in a proportional way, so that the smaller display region displays the same amount of information as before.

When the user moves the screen away from his/her eyes, the mobile terminal may determine that the target distance becomes larger. Accordingly, the display region may need to be bigger in order for the user to read the target content therein. Therefore, the mobile terminal may adjust to enlarge the display region. The word font size and image size in the display region may also be adjusted larger in a proportional way, so that the larger display region displays the same amount of information as before.

The size of the display region may be adjusted continuously based on the target distance, or may be adjust between different predetermined size based on the target distance.

Figure 7:
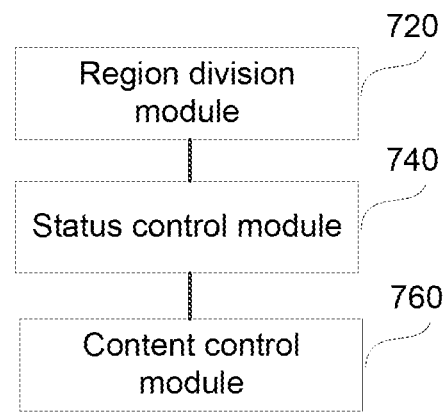
FIG. 7 is a block diagram illustrating an apparatus for controlling display according to an exemplary embodiment.

FIG. 7 is a block diagram illustrating an apparatus for controlling display according to an exemplary embodiment. As shown in FIG. 7, the apparatus for controlling display may be applied in the mobile terminal illustrated by any one of FIGS. 1A-1D, and may include the following modules but is not limited thereto.

A region division module 720 is configured to divide the touch screen into n display regions, wherein n≥2.

A status control module 740 is configured to control a display status for each display region among the n display regions, the display status including an activated state and a screen-off state.

A content control module 760 is configured to control display content of a display region in the activated state.

In the apparatus for controlling display according to the present embodiment, the touch screen of the mobile terminal is divided into different display regions, and display status of each display region as well as display content of display regions in the activated state may be controlled. Accordingly, both display status and display content of each display region can be controlled separately, thus diversity of display mode and a higher efficiency of screen utilization can be achieved. Moreover, display regions in the screen-off state may enable electricity consumption to be saved, and can be used as hand hold region of user so as to reduce possibility of false touch for the user.

Figure 8:
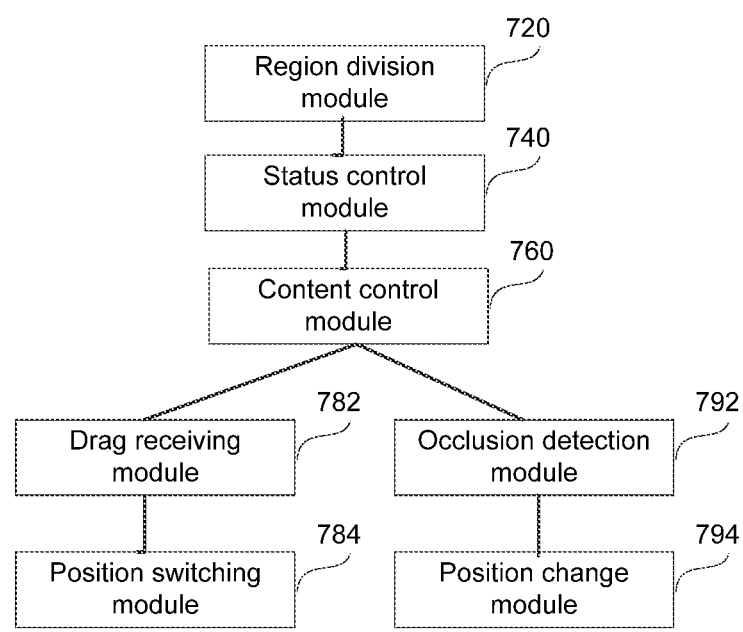
FIG. 8 is a block diagram illustrating an apparatus for controlling display according to another exemplary embodiment.

FIG. 8 is a block diagram illustrating an apparatus for controlling display according to another exemplary embodiment. As shown in FIG. 8, the apparatus for controlling display may be applied in the mobile terminal illustrated by any one of FIGS. 1A-1D, and may include the following modules but is not limited thereto.

A region division module 720 is configured to divide the touch screen into n display regions, wherein n≥2.

A status control module 740 is configured to control a display status for each display region among the n display regions, the display status including an activated state and a screen-off state.

A content control module 760 is configured to control display content of a display region in the activated state.

In an exemplary embodiment, the region division module 720 is configured to divide the touch screen into the n display regions according to a system default manner of the mobile terminal.

In another possible embodiment, the region division module 720 is configured to acquire a hand holding manner of a user, the hand holding manner including a left-hand holding manner or a right-hand holding manner; divide the touch screen into the n display regions according to a left-hand division manner if the hand holding manner is the left-hand holding manner; and divide the touch screen into the n display regions according to a right-hand division manner if the hand holding manner is the right-hand holding manner.

In yet another possible embodiment, the region division module 720 is configured to determine a palm touched area for a user by the touch screen; and divide the touch screen into an anti-false-touch region and the n display regions according to the palm touched area, the anti-false-touch region being an region irresponsive to received signal of palm touch and including the palm touched area.

In an exemplary embodiment, the status control module 740 is configured to enable at least one of the n display regions, where a first preset operation is detected, into the activated state, when the first preset operation is detected in the at least one of the n display regions; or, the status control module 740 is configured to enable the n display regions into the activated state when a second preset operation is detected in at least one of the n display regions.

The target display region may be a predetermined display region or may be any display region/regions of the n display regions. Alternatively, the mobile terminal may detect the first preset operation from other display regions of the n display regions and activate the target display region into the activated state.

In an exemplary embodiment, the content control module 760 is configured to determine a display content type corresponding to the display region in the activated state according to a preset correspondence, the preset correspondence indicating a correspondence between each display region and respective display content type thereof; and provide display content of the display content type as the display content of the display region.

In an exemplary embodiment, the status control module 740 is configured to, when unprocessed information is detected, enable a display region corresponding to the unprocessed information into the activated state according to a display content type of the unprocessed information and a preset correspondence, the preset correspondence indicating a correspondence between each display region and respective display content type thereof.

In an exemplary embodiment, the apparatus further includes: a drag receiving module 782 configured to receive a dragging signal with respect to one of the n display regions; and a position switching module 784 configured to switch a position of the one of the n display regions with a position of another display region according to the dragging signal.

In an exemplary embodiment, the apparatus further includes: an occlusion detection module 792 configured to detect by the touch screen whether there is a display region being occluded among the n display regions; and a position change module 794 configured to change a position of the display region being occluded among the n display regions if there is the display region being occluded.

In an exemplary embodiment, the position change module 794 is configured to: if there is an anti-false-touch region on the touch screen and a palm touched area disappears from the anti-false-touch region, change to provide the display region in the anti-false-touch region; or, provide the display region to overlap a display region having a lowest priority according to priorities of the n display regions; or, switch a display position of the display region with a display position of a display region having a lowest priority according to priorities of the n display regions.

As described above, in the apparatus for controlling display according to the present embodiment, the touch screen of the mobile terminal is divided into different display regions, and display status of each display region as well as display content of display regions in the activated state may be controlled; accordingly, both display status and display content of each display region can be controlled separately, thus diversity of display mode and a higher efficiency of screen utilization can be achieved. Moreover, display regions in the screen-off state may enable electricity consumption to be saved, and can be used as hand hold region of user so as to reduce possibility of false touch for the user.

In the apparatus for controlling display according to the present embodiment, the display position of a display region may be switched according to a dragging gesture of the user. Accordingly, a flexible display mode may be achieved.

In the apparatus for controlling display according to the present embodiment, if there is unprocessed information, only a display region corresponding to the unprocessed information is enabled into the activated state, and the display of the unprocessed information can be canceled according to a dragging gesture of the user. Accordingly, upon emergence of unprocessed information, the user may focus on checking the unprocessed information without being disturbed by other display content. Moreover, other display regions may be kept in the screen-off state so as to enhance the effect of power saving.

In the apparatus for controlling display according to the present embodiment, the hand holding manner of the user is analyzed automatically, and the division manner of display regions is adjusted dynamically according to the hand holding manner of the user. Accordingly, arrangement of display regions displayed by the mobile terminal fits better with operation habits of the user, and thus efficiency of user operations can be improved.

In the apparatus for controlling display according to the present embodiment, the anti-false-touch region is provided dynamically according to the palm touched area of the user. Accordingly, a chance of false touch from user palm onto the touch screen may be reduced, and thus normal operations can be achieved for the user even though the whole front surface of the mobile terminal is covered by the touch screen.

In the apparatus for controlling display according to the present embodiment, a display position of occluded display region may be changed dynamically. Accordingly, more display content with higher priority can be viewed by the user even he/she occludes part of display regions.

With respect to the apparatus in the above embodiments, the specific manners for performing operations for respective modules therein have been described in detail in the embodiments regarding the method, which will not be elaborated herein.

Figure 9:
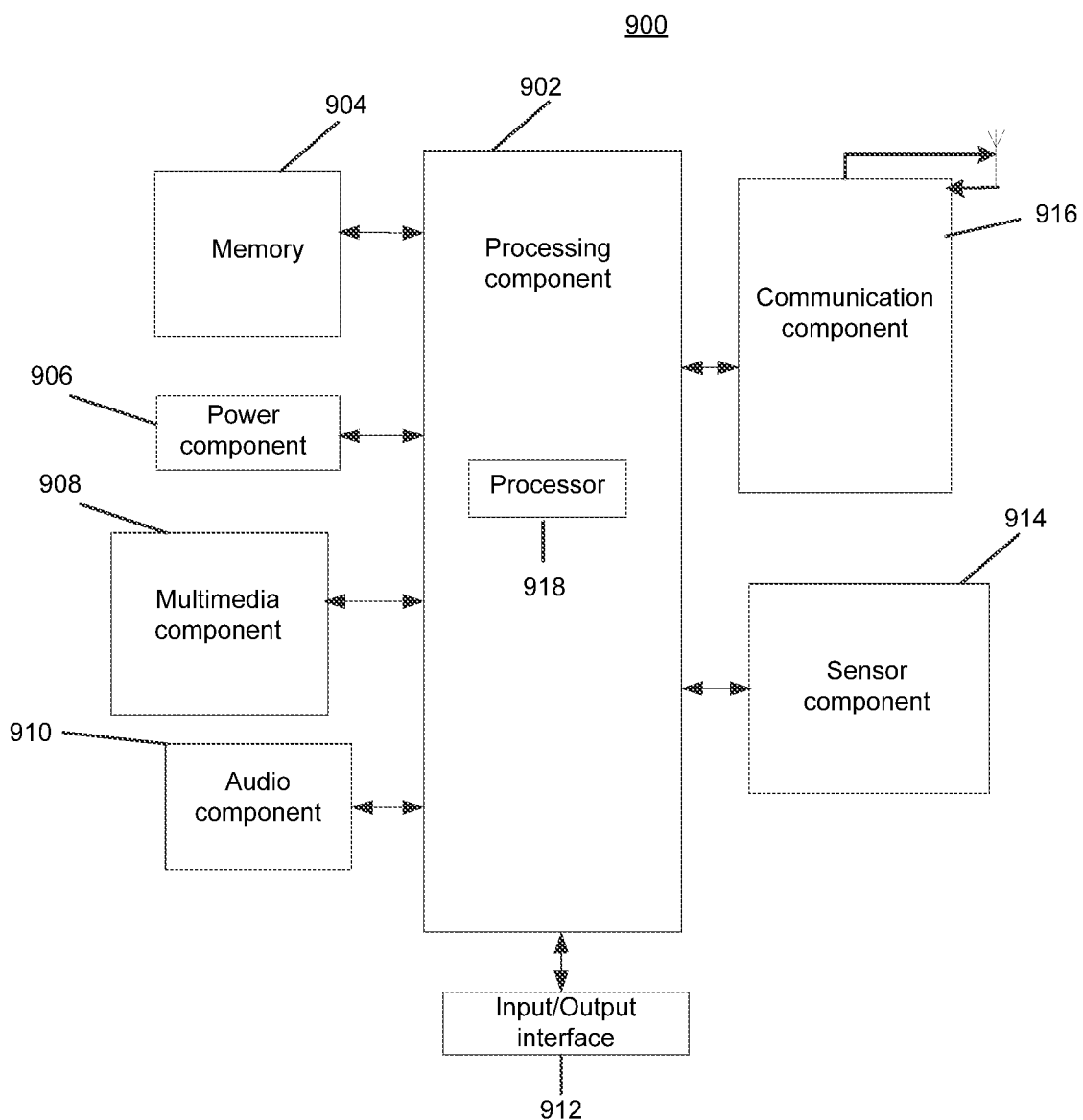
FIG. 9 is a block diagram illustrating an apparatus for controlling display according to another exemplary embodiment.

FIG. 9 is a block diagram illustrating an apparatus for controlling display according to another exemplary embodiment. The apparatus for controlling display may be implemented and/or may serve as the mobile terminal illustrated by any one of FIG. 1A to 1D.

Referring to FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 may control overall operations of the apparatus 900, such as operations associated with display, telephone calls, data communications, camera operations, and recording operations. The processing component 902 may include one or more processors 918 to execute instructions to perform all or part of the steps in the above described methods. Moreover, the processing component 902 may include one or more modules which facilitate interaction between the processing component 902 and other components. For instance, the processing component 902 may include a multimedia module to facilitate the interaction between the multimedia component 908 and the processing component 902.

The memory 904 is configured to store various types of data to support the operation of the apparatus 900. Examples of such data include instructions for any application or method operated on the apparatus 900, contact data, phonebook data, messages, pictures, videos, etc. The memory 904 may be implemented using any type of volatile or nonvolatile memory apparatus or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 906 provides power to various components of the apparatus 900. The power component 906 may include a power management system, one or more power sources, and other components associated with the generation, management, and distribution of power in the apparatus 900.

The multimedia component 908 includes a screen providing an output interface between the apparatus 900 and the user. In some embodiments, the screen may include a liquid crystal display (LCD) and a touch panel (TP). If the screen includes the touch panel, the screen may be implemented as a touch screen to receive input signal from the user. The touch panel includes one or more touch sensors to sense touches, slips, and gestures on the touch panel. The touch sensors may not only sense a boundary of a touch or slip action, but also sense a period of time and a pressure associated with the touch or slip action. The touch screen is connected with a touch integrated circuit (not shown in the drawing), and the touch integrated circuit is connected with the processor 918. In some embodiments, the multimedia component 908 includes a front camera and/or a rear camera. The front camera and/or the rear camera may receive an external multimedia datum while the apparatus 900 is in an operation mode, such as a photographing mode or a video mode. Each of the front camera and the rear camera may be a fixed optical lens system or have focus and optical zoom capability.

The audio component 910 is configured to output and/or input audio signal. For example, the audio component 910 may include a microphone (MIC) configured to receive external audio signal when the apparatus 900 is in an operation mode, such as a call mode, a recording mode, and a voice identification mode. The received audio signal may be further stored in the memory 904 or transmitted via the communication component 916. In some embodiments, the audio component 910 further may include a speaker to output audio signal.

The I/O interface 912 provides an interface between the processing component 902 and peripheral interface modules, such as a keyboard, a click wheel, a button, or the like. The button may include, but not limited to, a home button, a volume button, a starting button, or a locking button.

The sensor component 914 may include one or more sensors to provide status assessments of various aspects of the apparatus 900. For instance, the sensor component 914 may detect an open/closed status of the apparatus 900, relative positioning of components, e.g., the display and the keyboard, of the apparatus 900, a change in position of the apparatus 900 or a component of the apparatus 900, a presence or absence of user contact with the apparatus 900, an orientation or an acceleration/deceleration of the apparatus 900, and a change in temperature of the apparatus 900. The sensor component 914 may may include a proximity sensor configured to detect the presence of nearby objects without any physical contact. The sensor component 914 may also may include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the apparatus 900 and other apparatuses. The apparatus 900 may access a wireless network based on a communication standard, such as WIFI, 2G, or 3G, or a combination thereof. In one exemplary embodiment, the communication component 916 receives broadcast signal or broadcast associated information from an external broadcast management system via a broadcast channel. In one exemplary embodiment, the communication component 916 further may include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 900 may be implemented with one or more application specific integrated circuits (ASICs), digital signal processors (DSPs), digital signal processing apparatuses (DSPDs), programmable logic apparatuses (PLDs), field programmable gate arrays (FPGAs), controllers, micro-controllers, microprocessors, or other electronic components, for performing the above method.

In exemplary embodiments, there is also provided a non-transitory computer readable storage medium including instructions, such as instructions included in the memory 904, executable by the processor 918 in the apparatus 900, for performing the above method. For example, the non-transitory computer-readable storage medium may be a ROM, a random access memory (RAM), a CD-ROM, a magnetic tape, a floppy disc, an optical data storage apparatus, or the like.

Other embodiments of the invention will be apparent to those skilled in the art from consideration of the specification and practice of the invention disclosed herein. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the invention only be limited by the appended claims.

The invention claimed is:

1. A mobile terminal, comprising:
   a touch screen;
   a processor-readable storage medium, including a set of instructions for controlling display of the mobile terminal on the touch screen; and
   a processor in communication with the storage medium and the touch screen, wherein when executing the set of instructions, the processor is directed to:
   divide the touch screen into a plurality of display regions according to an operational distance from a user's hand holding the mobile terminal such that the plurality of display regions have different operational distances from the user's hand holding the mobile terminal,
   wherein each of the plurality of display regions is configured to display contents of one of predetermined content types, the predetermined content types being arranged in a priority order,
   wherein display regions with a smaller distance from the user's hand holding the mobile terminal are configured to display contents with a content type having a higher priority, and display regions with a greater distance from the user's hand holding the mobile terminal are configured to display contents with a content type having a lower priority, and wherein the display regions with a smaller distance from the user's hand holding the mobile terminal are larger than the display regions with a greater distance from the user's hand holding the mobile terminal;

control a display status for each of the plurality of display regions separately; and display content in a target display region of the plurality of display regions when the target display region is in an activated state, and wherein the processor is further directed to:
collect historical operation data of a user on the touch screen;
determine, based on the collected historical operation data, a most frequently touched area in a first display region of the plurality of display regions; and
arrange the most frequently touched area as a center of the first display region of the plurality of display regions.

2. The mobile terminal according to claim 1, wherein the processor is further directed to:
obtain a hand holding manner of the user who is holding the mobile terminal; and
divide the touch screen into the plurality of display regions based on the hand holding manner.

3. The mobile terminal according to claim 2, wherein the hand holding manner comprising a left-hand holding manner and a right-hand holding manner.

4. The mobile terminal according to claim 1, wherein to divide the touch screen into the plurality of display regions, the processor is further directed to:
determine a palm touched area on the touch screen touched by the user's hand holding the mobile terminal; and
divide the touch screen into an anti-false-touch region and a second plurality of display regions, the anti-false-touch region including the palm touched area and being irresponsive to received signals caused by touching from the user's hand.

5. The mobile terminal according to claim 1, wherein the processor is further directed to perform at least one of:
turning the target display region into the activated state when detecting a first preset operation in at least one region of the plurality of display regions; or
turning the plurality of display regions into the activated state when detecting a second preset operation in the at least one region.

6. The mobile terminal according to claim 5, wherein to display the content in the target display region, the processor is further directed to:
determine a target display content type corresponding to the target display region according to a preset correspondence defining relationship between each of the plurality of display regions and a respective display content type; and
provide display content of the target display content type to the target display region.

7. The mobile terminal according to claim 1, wherein the processor is further directed to: when detecting unprocessed information,
treat a display region corresponding to the unprocessed information as the target display region;

turn the target display region into the activated state; and
display the unprocessed information in the target display region.

8. The mobile terminal according to claim 1, wherein the processor is further directed to:
receive a dragging signal from the touch screen with respect to a display region of the plurality of display regions; and
switch a position of the display region with a position of another display region of the plurality of display regions according to the dragging signal.

9. The mobile terminal according to claim 1, wherein the processor is further directed to:
detect, from the plurality of display regions, an occluded display region that is occluded; and
change a position of the occluded display region so that the occluded display region is no longer occluded.

10. The mobile terminal according to claim 9, wherein to change the position of the occluded display region, the processor is further directed to perform at least one of:
when the touch screen includes an anti-false-touch region and a palm touched area in the anti-false-touch region disappears, providing the anti-false-touch region to the occluded display region;
moving the occluded display region to overlap a low priority display region having a lowest priority according to priorities of the plurality of display regions; or
switching the position of the occluded display region with a position of the low priority display region.

11. The mobile terminal according to claim 1, further comprising:
a middle frame of a frame body;
a front surface of the frame body; and
a touch screen covering an entire surface of a display area.

12. The mobile terminal according to claim 1, further comprising:
a middle frame of a frame body;
a front surface of the frame body, including a display area and an exposure area;
a touch screen covering an entire area of the display area; and
at least one additional electronic device operation of which is not required in order to activate the mobile terminal, each including an exposure on the exposure area of the front surface.

13. A method for controlling display of a mobile terminal on its touch screen, comprising:
dividing, by a hardware processor of a mobile terminal having a touch screen, the touch screen into a plurality of display regions according to an operational distance from a user's hand holding the mobile terminal such that the plurality of display regions have different operational distances from the user's hand holding the mobile terminal,
wherein each of the plurality of display regions is configured to display contents of one of predetermined content types, the predetermined content types being arranged in a priority order,
wherein display regions with a smaller distance from a user's hand holding the mobile terminal are configured to display contents with a content type having a higher priority, and display regions with a greater distance from the user's hand holding the mobile terminal are configured to display contents with a content type having a lower priority, and
wherein the display regions with a smaller distance from the user's hand holding the mobile terminal are larger than the display regions with a greater distance from the user's hand holding the mobile terminal;

controlling, by the processor, a display status for each of the plurality of display regions separately; and displaying, by the processor, content in a target display region of the plurality of display regions when the target display region is in an activated state, wherein the method further comprises:
- collecting historical operation data of a user on the touch screen;
- determining, based on the collected historical operation data, a most frequently touched area in a first display region of the plurality of display regions; and
- arranging the most frequently touched area as a center of the first display region of the plurality of display regions.

14. The method according to claim 13, further comprising:
- obtaining, by the processor, a hand holding manner of the user who is holding the mobile terminal; and
- dividing, by the processor, the touch screen into the plurality of display regions based on the hand holding manner,
- wherein the hand holding manner includes a left-hand holding manner and a right-hand holding manner.

15. The method according to claim 13, wherein the dividing of the touch screen into the plurality of display regions comprising:
- determining a palm touched area on the touch screen touched by the user's hand holding the mobile terminal; and
- dividing the touch screen into an anti-false-touch region and a second plurality of display regions, the anti-false-touch region including the palm touched area and being irresponsive to received signals caused by touching from the user's hand.

16. The method according to claim 13, further comprising at least one of:
- turning, by the processor, the target display region into the activated state when detecting a first preset operation in at least one region of the plurality of display regions; or
- turning, by the processor, the plurality of display regions into the activated state when detecting a second preset operation in the at least one region.

17. The method according to claim 16, wherein the displaying of the content in the target display region comprising:
- determining a target display content type corresponding to the target display region according to a preset correspondence defining relationship between each of the plurality of display regions and a respective display content type; and
- providing display content of the target display content type to the target display region.

18. The method according to claim 13, further comprising, when the processor detects unprocessed information,
- treating, by the processor, a display region corresponding to the unprocessed information as the target display region;
- turning, by the processor, the target display region into the activated state; and
- displaying, by the processor, the unprocessed information in the target display region.

19. The method according to claim 13, further comprising:
- receiving, by the processor, a dragging signal from the touch screen with respect to a display region of the plurality of display regions; and
- switching, by the processor, a position of the display region with a position of another display region of the plurality of display regions according to the dragging signal.

20. The method according to claim 13, further comprising:
- detecting, by the processor, from the plurality of display regions, an occluded display region that is occluded; and
- when the touch screen includes an anti-false-touch region and a palm touched area in the anti-false-touch region disappears, providing, by the processor, the anti-false-touch region to the occluded display region;
- moving, by the processor, the occluded display region to overlap a low priority display region having a lowest priority according to priorities of the plurality of display regions; or
- switching, by the processor, a position of the occluded display region with a position of the low priority display region.

* * * * *